(12) United States Patent
Maim

(10) Patent No.: US 12,365,422 B2
(45) Date of Patent: Jul. 22, 2025

(54) MARINE CRAFT

(71) Applicant: Enrico Maim, Sceaux (FR)

(72) Inventor: Enrico Maim, Sceaux (FR)

(*) Notice: Subject to any disclaimer, the term of this patent is extended or adjusted under 35 U.S.C. 154(b) by 748 days.

(21) Appl. No.: 17/608,830

(22) PCT Filed: Jun. 2, 2020

(86) PCT No.: PCT/IB2020/055193
§ 371 (c)(1),
(2) Date: Nov. 4, 2021

(87) PCT Pub. No.: WO2020/225802
PCT Pub. Date: Nov. 12, 2020

(65) Prior Publication Data
US 2022/0281557 A1    Sep. 8, 2022

Related U.S. Application Data

(60) Provisional application No. 62/968,365, filed on Jan. 31, 2020, provisional application No. 62/951,224, (Continued)

(30) Foreign Application Priority Data

May 5, 2019 (FR) ...................................... 1904707
Jun. 14, 2019 (FR) ...................................... 1906417

(51) Int. Cl.
*B63B 1/14* (2006.01)
*B63B 21/56* (2006.01)
(Continued)

(52) U.S. Cl.
CPC ................ *B63B 1/14* (2013.01); *B63B 21/56* (2013.01); *B63B 35/66* (2013.01); *B63B 39/02* (2013.01);
(Continued)

(58) Field of Classification Search
CPC ............. B63H 21/17; B63H 2021/171; B63B 2035/4453; B63B 2209/18; B63B 1/10;
(Continued)

(56) References Cited

U.S. PATENT DOCUMENTS 3,645,225 A      2/1972  Lunde
3,815,541 A  *   6/1974  Hansen .................. B63B 35/68
                                                    114/259

(Continued)

FOREIGN PATENT DOCUMENTS

DE    102013002720 A1  *  8/2014  ............... B63B 1/26
DE    202019002311 U1  *  1/2020
(Continued)

OTHER PUBLICATIONS

International Search Report and English Translation for corresponding International Application No. PCT/B2020/055193, dated Nov. 10, 2020. 5 pages.

*Primary Examiner* — Ajay Vasudeva

(57) ABSTRACT

The invention relates to a water-going assembly comprising a first buoyant structure (S1) comprising at least two hulls (F1, F1'; F11, F11', F12, F12') delimiting between them a space (E1) and a photovoltaic arrangement (PH1) occupying a substantial proportion of the footprint of the buoyant structure, and a second buoyant structure (S2) provided with an electric thruster (P2) and with a battery (B2), means for assembling the two buoyant structures detachably, with means of electrical connection between the photovoltaic arrangement of the first buoyant structure and the battery of the second buoyant structure, the latter being able to be used for moving the two structures (S1, S2) with a directional guidance, or as an autonomous motorized marine craft.

51 Claims, 37 Drawing Sheets

Related U.S. Application Data filed on Dec. 20, 2019, provisional application No. 62/867,258, filed on Jun. 27, 2019.

(51) Int. Cl.
*B63B 35/66* (2006.01)
*B63B 39/02* (2006.01)
*B63H 11/00* (2006.01)
*B63H 21/17* (2006.01)
*B63H 25/38* (2006.01)
*B63J 3/04* (2006.01)

(52) U.S. Cl.
CPC ............ *B63H 11/00* (2013.01); *B63H 21/17* (2013.01); *B63H 25/38* (2013.01); *B63J 3/04* (2013.01); *B63H 2021/171* (2013.01)

(58) Field of Classification Search
CPC ..... B63B 1/12; B63B 1/121; B63B 2001/123; B63B 1/125; B63B 1/14; B63B 2001/145; B63B 21/56; B63B 2021/563; B63B 2021/566; B63B 35/66; B63B 35/665; B63B 35/68; B63B 35/70; B63J 2003/003; Y02T 70/50; Y02T 70/52368

USPC ...................... 114/248–245, 258, 259; 440/6
See application file for complete search history.

(56) References Cited

U.S. PATENT DOCUMENTS

| | | | | |
|---|---|---|---|---|
| 6,035,796 | A * | 3/2000 | Vowels | B63B 35/665 |
| | | | | 114/248 |
| 7,047,899 | B2 * | 5/2006 | Laurilehto | B63H 23/28 |
| | | | | 114/260 |
| 8,894,454 | B2 * | 11/2014 | Lorang | B63B 35/70 |
| | | | | 440/8 |
| 2007/0283866 | A1 | 12/2007 | Veazey | |
| 2010/0009579 | A1 | 1/2010 | Wood | |

FOREIGN PATENT DOCUMENTS

| | | | | |
|---|---|---|---|---|
| EP | 3299273 | A1 | 3/2018 | |
| EP | 3299273 | B1 * | 2/2019 | ............... B63C 1/02 |
| FR | 2796036 | A1 | 1/2001 | |
| FR | 2852573 | A1 | 9/2004 | |
| KR | 20130029542 | A | 3/2013 | |
| WO | WO-2008020264 | A1 * | 2/2008 | ............... B63B 1/10 |
| WO | WO-2020016651 | A2 * | 1/2020 | ............ B63B 1/121 |

* cited by examiner

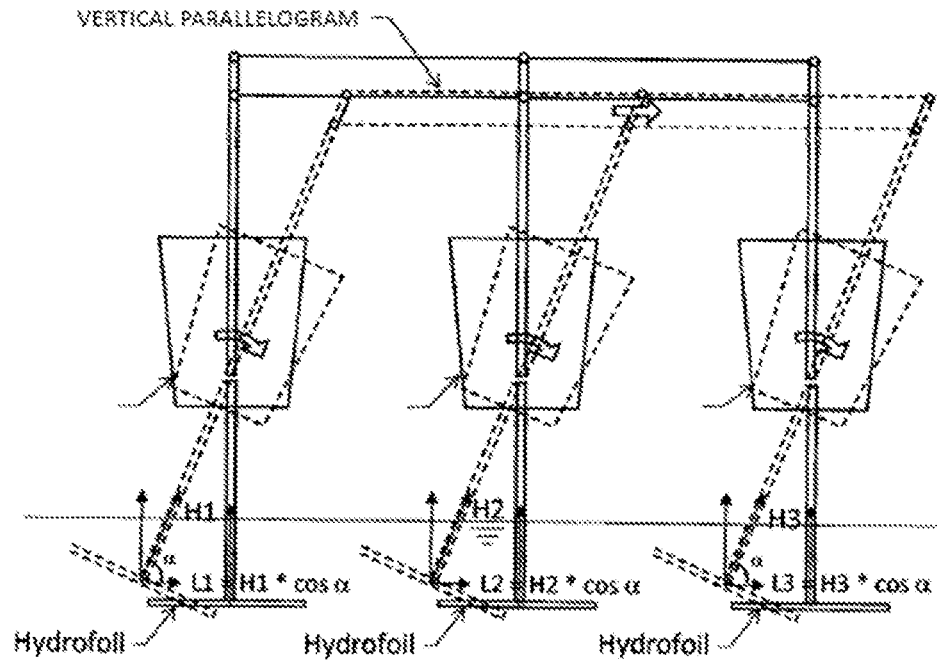
FIG. 44
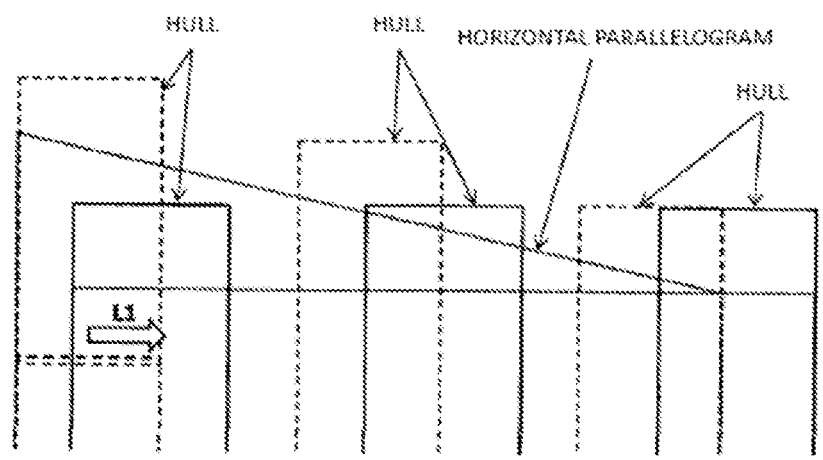

MARINE CRAFT

CROSS-REFERENCE TO RELATED PATENT APPLICATIONS

This application is a U.S. National Stage Application under 35 U.S.C. § 371 of International Patent Application No. PCT/IB2020/055193 filed Jun. 2, 2020, which claims the benefit of priority under 35 U.S.C. Section 119 (e) of U.S. Patent Application Nos. 62/968,365 filed Jan. 31, 2020, 62/951,224 filed Dec. 20, 2019, and 62/867,258 filed on Jun. 27, 2019. The International application also claims the benefit of French Patent Application numbers FR1906417, filed Jun. 14, 2019 and FR1904707, filed on May 5, 2019, all of which are incorporated by reference in their entireties. The International Application was published on Nov. 12, 2020, as International Publication No. WO 2020/225802 A2.

The present invention relates generally to marine crafts, such as pleasure boats or utility vessels.

Catamaran-type vessels have been known for some time having a roof whereof the majority of the surface comprises photovoltaic panels. See for example the catamarans sold by the companies Silent-Yachts, Soel Yachts, etc.

The large photovoltaic conversion surface area makes it possible to impart significant autonomy to the vessel, and to use relatively powerful and very quiet propulsion means.

The present invention aims to enrich the possibilities offered by this type of vessel.

To this end, proposed is a water-going assembly comprising a first buoyant structure comprising at least two hulls delimiting between them a space and a photovoltaic arrangement occupying a substantial proportion of the footprint of the buoyant structure, and a second buoyant structure provided with an electric thruster and a battery, means for assembling the two buoyant structures detachably, the assembly comprising means of electrical connection between the photovoltaic arrangement of the first buoyant structure and the battery of the second buoyant structure, the latter being able to be used for moving the two structures with a directional guidance, or as an autonomous motorized marine craft.

Other advantageous, but non-limiting features of this assembly are as follows:
- the assembly means comprise securing means, including shock and/or deformation absorbing means.
- the first buoyant structure also comprises electric thrusters.
- the first buoyant structure also comprises batteries.
- the assembly comprises means for controlling the incline between a main axis of the first structure and a main axis of the second buoyant structure.
- the incline control means comprise a pivot link between the first buoyant structure and the second buoyant structure, and means for biasing the second structure from the first structure at a distance from the pivot link.
- the pivot point is fixed.
- the pivot point is located behind a point where the biasing means operate.
- the biasing means comprise a means for driving a toothed wheel against a curved rack centered on the pivot point.
- the pivot point can move relative to the first structure.
- the pivot point is able to slide against a bearing surface, the pivot point and the bearing surface being able to transmit, to the first structure, a thrust generated at the second structure.
- the bearing surface is curved.
- the biasing means are able to exert traction laterally on the second structure behind the pivot link.
- the first buoyant structure comprises a first pair of fixed lateral floats and a second pair of floats mounted on a mobile equipment item pivoting about a vertical axis, the floats of the second pair being located in front of the floats of the first pair.
- the securing means comprise means for pulling the first structure via the second structure.
- the second structure is connected to the mobile equipment item of the first structure, said mobile equipment item adapting its orientation as a function of the pulling direction.
- the pulling means comprises a pair of cables.
- the cables have a fixed length.
- when the two buoyant structures are secured, the second structure is located essentially in the footprint of the first structure, the pulling means operating between the front region of the second structure and the mobile equipment item.
- the second structure acts mechanically on the angle of the rudder of the first structure during a turn, thus making it possible to perform a shorter turn.
- the first structure comprises a U-shaped hoop, the device for detachably securing the two structures comprises a means for retaining the second structure in a front-back direction relative to the first, able to connect the second structure to the hoop of the first structure, and, when the two structures are secured, the second structure is located in the footprint of the hoop and is able to pull the first structure via the front-back retaining means.
- the hoop is in the shape of an arc of circle, the center of which is located in front of the second structure.
- the hoop is in the shape of an arc of circle, the center of which is located at the center of the second structure.
- the rear part of the securing between the second buoyant structure and the hoop can move laterally over the hoop.
- the rear part cannot move laterally over the hoop when the second structure exerts a significant tractive force on the securing.
- the hoop can move laterally by pivoting about a vertical axis.
- the superstructure (ST1) is tilted forward so as to oppose less wind resistance.
- a floor is suspended from the superstructure (ST1), electric batteries serving as counterweights to rebalance the floor automatically by moving them on rails.
- the means for detachably assembling the two buoyant structures comprise an assembly device comprising means for suspending the second buoyant structure from the framework of the first buoyant structure, the assembly device making it possible to maximize the surface of the photovoltaic arrangement by allowing the surface of the assembly to be completely covered with solar panels.
- the assembly device comprises means for retaining the second buoyant structure in a front-back direction relative to the first buoyant structure.
- the assembly device comprises means for retaining the second buoyant structure laterally relative to the first buoyant structure.
- the assembly device comprises means for retaining the second buoyant structure top-to-bottom relative to the first buoyant structure.
- the suspension or retaining means comprise straps.

some straps extend obliquely toward the rear, from the second buoyant structure toward the first buoyant structure.

the suspension or retaining means are able to attach the second buoyant structure to a superstructure of the first buoyant structure bearing a roof supporting the photovoltaic arrangement.

the first buoyant structure and/or the second buoyant structure comprises hydrofoils.

the floats of the first buoyant structure are hinged on the framework about axes that are generally parallel to a longitudinal axis of said structure, and comprise wheels protruding downward past the floats in a certain angular position of the floats.

the assembly comprises means for angular blocking of the floats in a navigation position and in a rolling position, respectively.

each float of the first structure comprises a buoyancy tank, and the first buoyant structure comprises means for selectively filling each of the buoyancy tanks with water or air.

the arrangement of photovoltaic panels of the first structure comprises mobile panels able to be deployed selectively.

a floor is suspended from the hinged framework of the first buoyant structure, electric batteries serving as counterweights to rebalance the floor automatically by moving them on rails.

an electric thruster causes, during a turn, a rotation of the hull by a certain angle about an axis that is generally parallel to its path, and the framework comprises a hinged assembly in the shape of a parallelogram, the angles of which vary depending on said angle of rotation, causing a rotation by a same angle for all the hulls of the assembly.

the framework comprises hinges placed on parallel lines, in vertical planes perpendicular to the path of the assembly, the lines being vertical when the hulls are not inclined laterally and the angle of the lines relative to the vertical varying depending on the angle of rotation of the hulls, the second structure being able to be assembled with the first on hinges placed on such a line in each vertical plane, such that a rotation of the hull of the second structure about an axis parallel to its trajectory causes a rotation by a same angle for the hulls of the first structure and vice versa.

said angles vary depending on the angle of a rotation caused by the electric thruster of the second structure about an axis that is generally parallel to its path.

said angles vary depending on the angle of the rotations caused by the electric thrusters of the first structure about axes that are generally parallel to their path.

said angles vary depending on the angle of the rotations caused by the electric thrusters of the first and second structures about axes that are generally parallel to their path.

the nautical assembly comprises, below the hulls and at the propellers, hydrofoils causing a lateral thrust, the force of which depends on said angle of rotation.

a floor is suspended from the hinged framework of the first buoyant structure, electric batteries serving as counterweights to rebalance the floor automatically by moving them on rails.

the top view of the superstructure of the first buoyant structure goes from the shape of a rectangle to the shape of a parallelogram and the lateral thrust caused by the outermost hydrofoils relative to the turn are located further forward after this transformation.

the parallelogram-shaped superstructure bears the roof, which bears the photovoltaic arrangement, and the latter is made up of bands of photovoltaic panels that slide relative to one another such that the surface occupied by the set of bands continually corresponds to the parallelogram during said passage from the rectangular shape to the parallelogram shape.

the passage from the rectangular shape to the parallelogram shape is obtained by electromechanical means.

the first buoyant structure also comprises at least one electric thruster and the passage from the rectangular shape to the parallelogram shape (Horizontal Parallelogram) is obtained by a higher power on a thruster propelling a hull that is further to the outside relative to the turn.

Other aspects, aims and advantages of the present invention will better appear upon reading the following detailed description of several embodiments thereof, provided as non-limiting examples and done in reference to the appended drawings.

Figure 39:
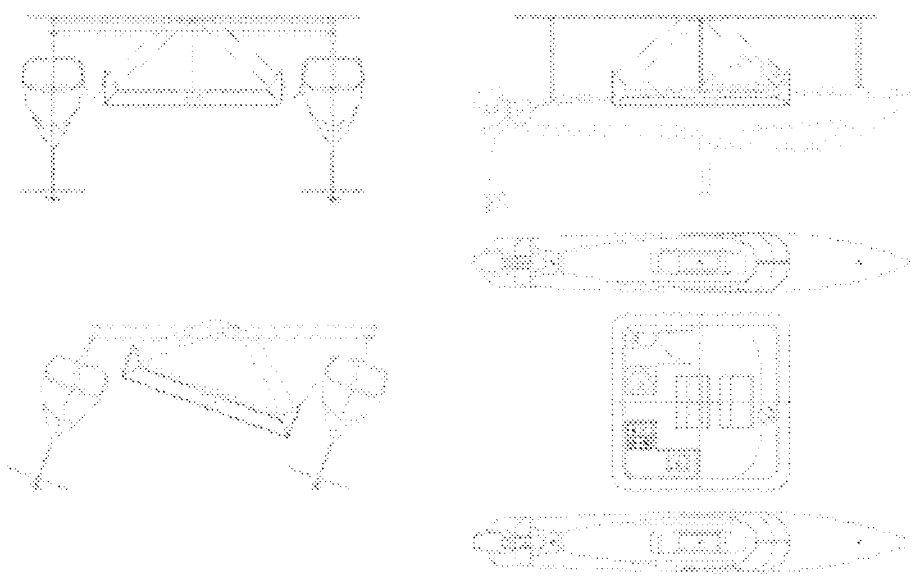
FIG. 39 shows the first structure of FIG. 37, but with a self-balancing suspended floor.
Figure 40:
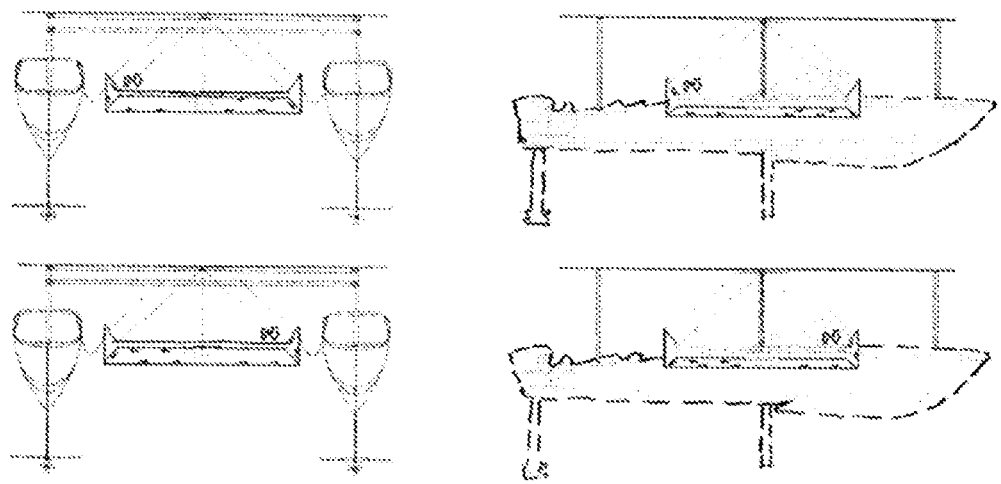
FIG. 40 illustrates the self-balancing of the self-balancing floor of FIG. 37.
Figure 41:
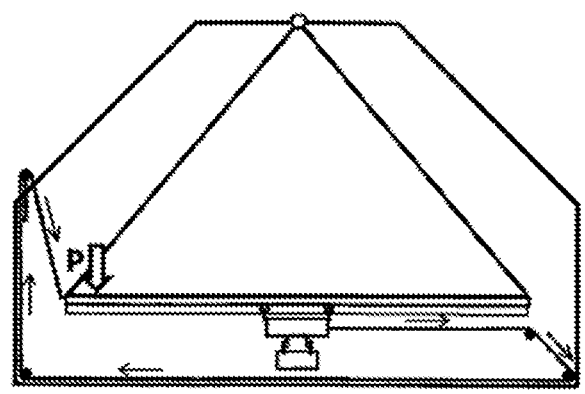

FIG. 41 schematically shows a section of a self-balancing floor like that of FIGS. 39 and 40, outlining the base and the ground.

Figure 42:
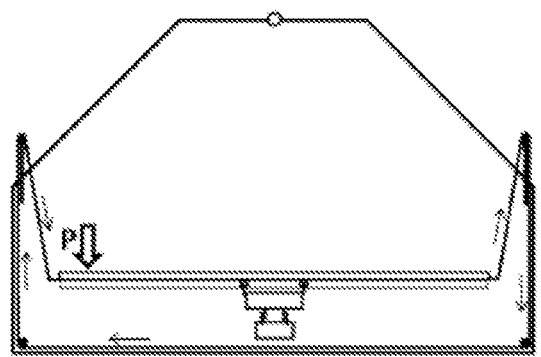

FIG. 42 schematically shows a variant of the floor of FIG. 41, in which the ground is suspended from the base rather than directly from the superstructure.

An assembly according to the invention comprises two buoyant structures S1 and S2. It will first be noted that, to the extent possible, reference signs ending with "1" refer to elements or parts belonging to the structure S1, while reference signs ending with "2" refer to elements or parts belonging to the structure S2. Furthermore, from one figure to the next, identical or similar elements are designated by the same reference signs as much as possible, and will not be described again each time. Moreover, for clarification purposes, reference is sometimes made to reference signs that are not noted, but are obvious by looking at the drawings.

Figure 1:
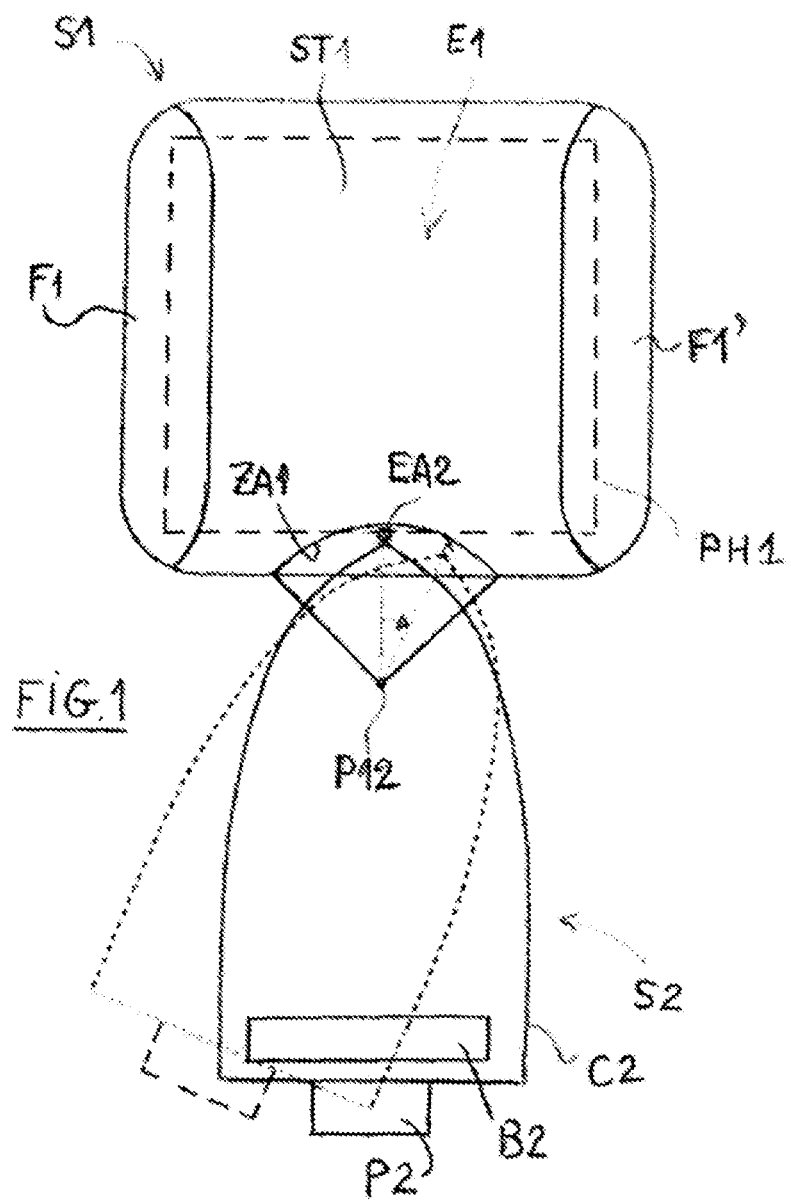
FIG. 1 is a schematic top view of an assembly according to a first embodiment.
Figure 2:
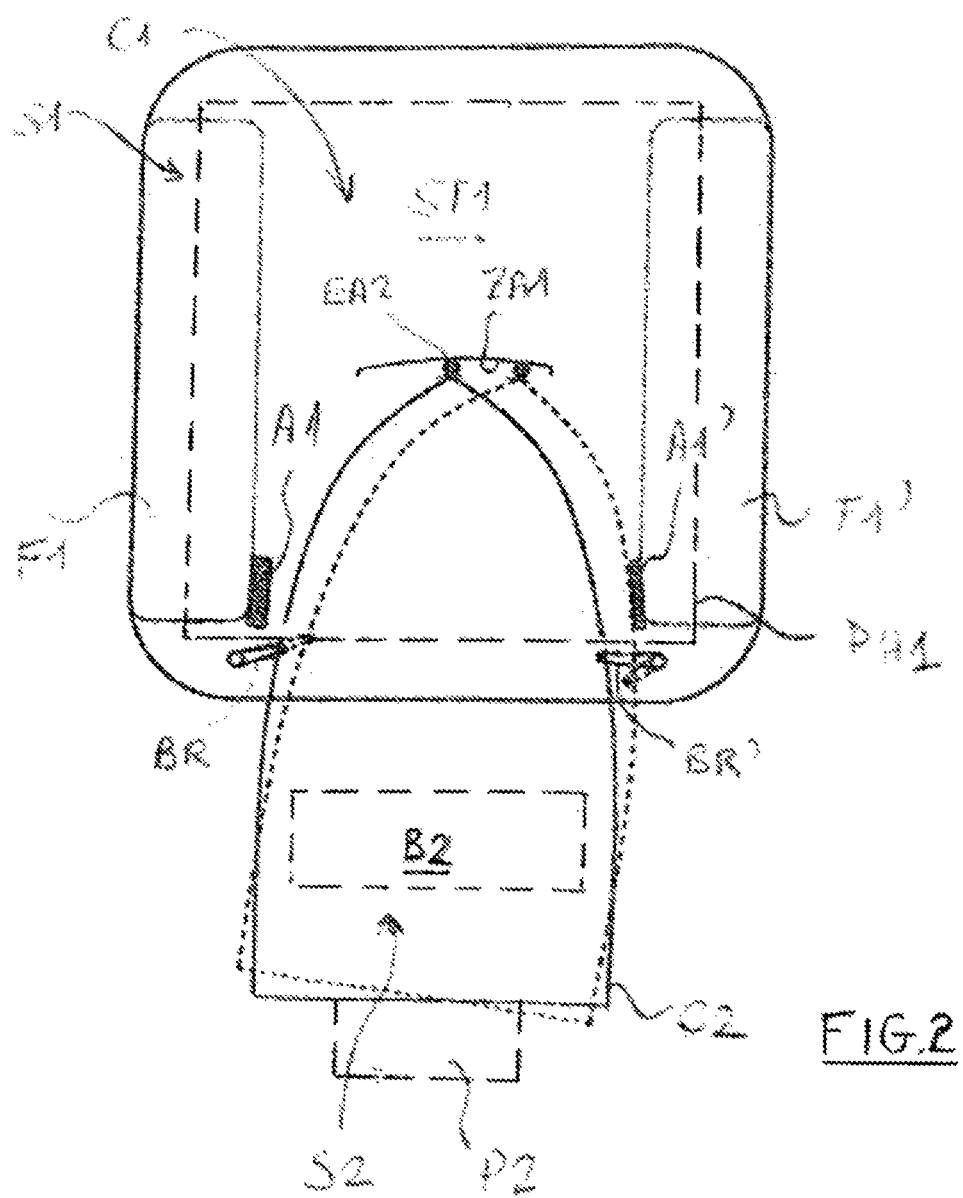
FIG. 2 is a schematic top view of an assembly according to a second embodiment.
Figure 3:
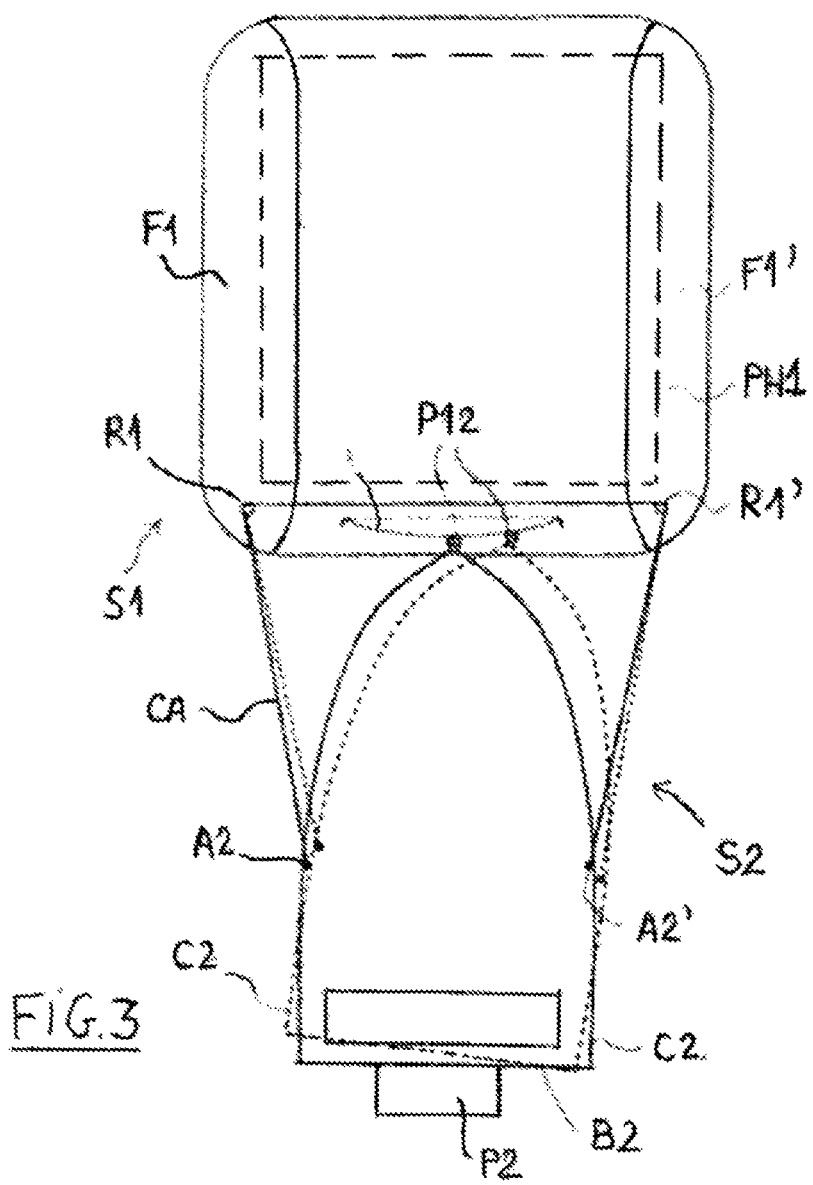
FIG. 3 is a schematic top view of an assembly according to a third embodiment.

In FIGS. 1 to 3, reference S1 refers to a first buoyant structure, here of the catamaran type, with a superstructure ST1 and two floats F1, F1' leaving a space E1 between them between the superstructure ST1 and the water level.

The superstructure and the inside of the floats can comprise all living, sleeping, working, etc. arrangements.

Reference S2 refers to a second buoyant structure, which generally has a smaller footprint and is capable of engaging at least partially in the space between the floats F1, F1'.

This structure, here of the single-hull type (it may also be a smaller catamaran) with a hull C2, an electric thruster P2 of any appropriate type, and a battery B2 (the term "battery" also encompassing a set of batteries), distributed appropriately in the structure S2.

The buoyant structure S1 may also optionally comprise its own battery and its own thruster.

In reference in particular to FIG. 1, the structure S2 may be secured releasably to the structure S1 at a pivot P12 located behind the structure S1 and in the front region of the structure S2, such that the front of the structure S2 is partially engaged in the space E1.

The securing of the two structures also comprises a bearing element EA2 of the structure S2 on a bearing zone ZA1 of the structure S1, arranged along an arc of circle centered on the pivot P12, such that when the incline of the axis of the structure S2 relative to the axis of the structure S1 changes, the bearing element EA2 moves horizontally along the bearing zone ZA.

In a first embodiment, the bearing element EA2 is made up of a toothed wheel, and the bearing zone is made up of a rack. A motor provided in association with the toothed wheel EA2 makes it possible to rotate the latter, so as to vary the incline between the axes of the two structures on demand. For an axial thrust of the thruster P2, a mutual incline of the axes of the two structures will be able to rotate the assembly in one direction or the other during navigation. It will be noted that the thrust is transmitted here by the pivot P12, either by the bearing element/bearing zone cooperation, or in a manner distributed between the two.

According to another embodiment, the link between the bearing element EA2 and the bearing zone ZA1 uses free sliding, or free rolling, and the control of the assembly is done via governing of the thrust direction of the thruster P2 by a measurement of the mutual incline between the axes of the two structures, and taking account of a setpoint direction.

In reference now to FIG. 2, the securing between the structures S1 and S2 is done first using a bearing element EA2 that is capable of sliding or rolling with a limited mechanical resistance along a bearing zone ZA1 secured to the structure S1 and which here is generally smooth.

It is also noted that the bearing zone ZA1 is located much further forward of the structure S1 than in the case of FIG. 1.

The mutual incline of the structures S1 and S2 is controlled using motorized lateral arms BR, BR' operating between the rear of the structure S1 and the sides of the structure S2, the synchronized control of these arms making it possible to rotate the structure S2 relative to the structure S1 by combining a rotational movement (to rotate the hull C2) and a translational movement (to absorb the resulting changes in length).

During incline variations, the bearing element EA2 moves freely along the bearing zone ZA1. It is between these two members that the thrust of the structure S2 on the structure S1 is transmitted.

It can be seen that in this embodiment, shock absorbers A1, A1' provided on the structure S1, and for example made from elastomer or foam, make it possible to absorb any impacts between the hulls of the two structures, in particular during the securing and undocking phases.

The assembly of FIG. 3 operates according to a principle similar to that of FIG. 2, with the exception that the structure S2 is placed substantially further toward the rear during securing, and that the incline change is controlled using a cable CA whose movements are controlled using a motorized system on board the structure S1, which cable is connected to attachment points A2, A2' on the sides of the hull C2. Depending on the static and dynamic configuration of the cable CA, the bearing zone ZA1 that receives the thrust from the bearing element EA1 and against which the latter can slide freely can be convex (as illustrated), or rectilinear or concave like in the previous case.

In a variant, it is possible to provide a set of two or more cables, controlled synchronously.

Figure 4:
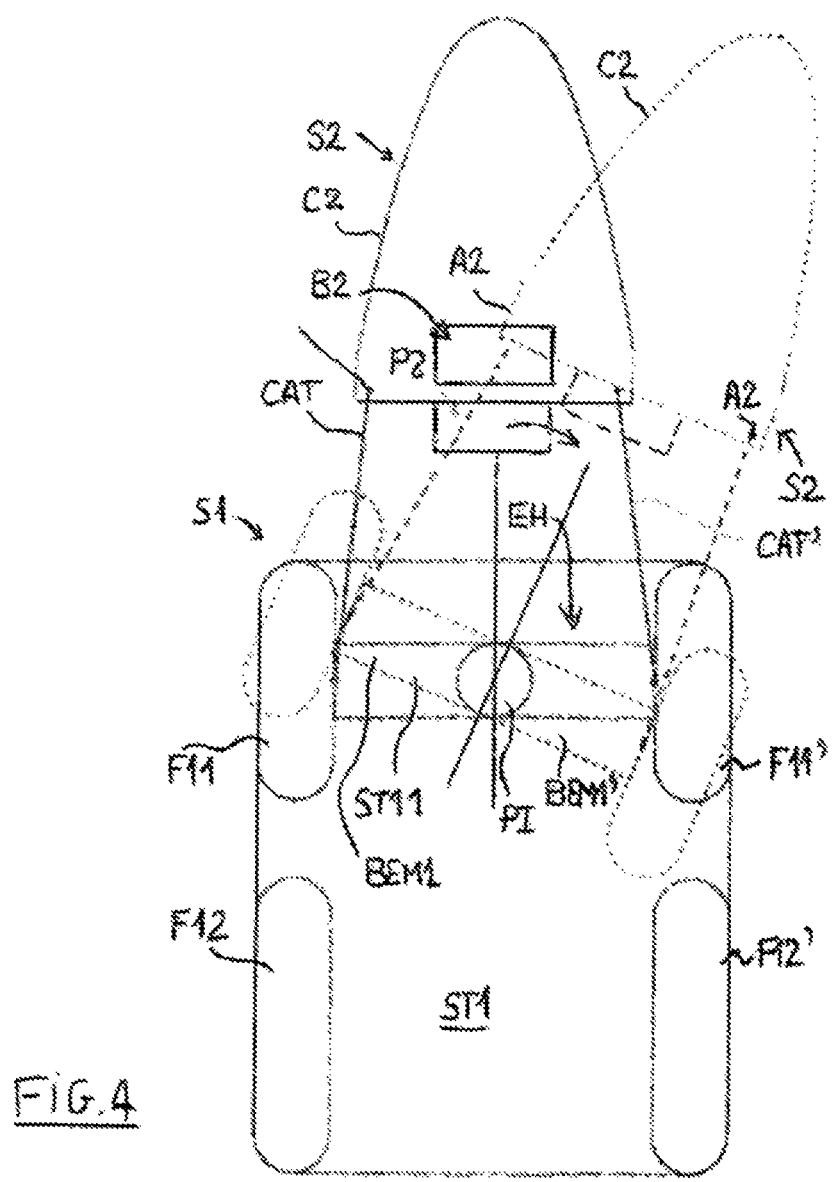
FIG. 4 is a schematic top view of an assembly according to a fourth embodiment.
Figure 5:
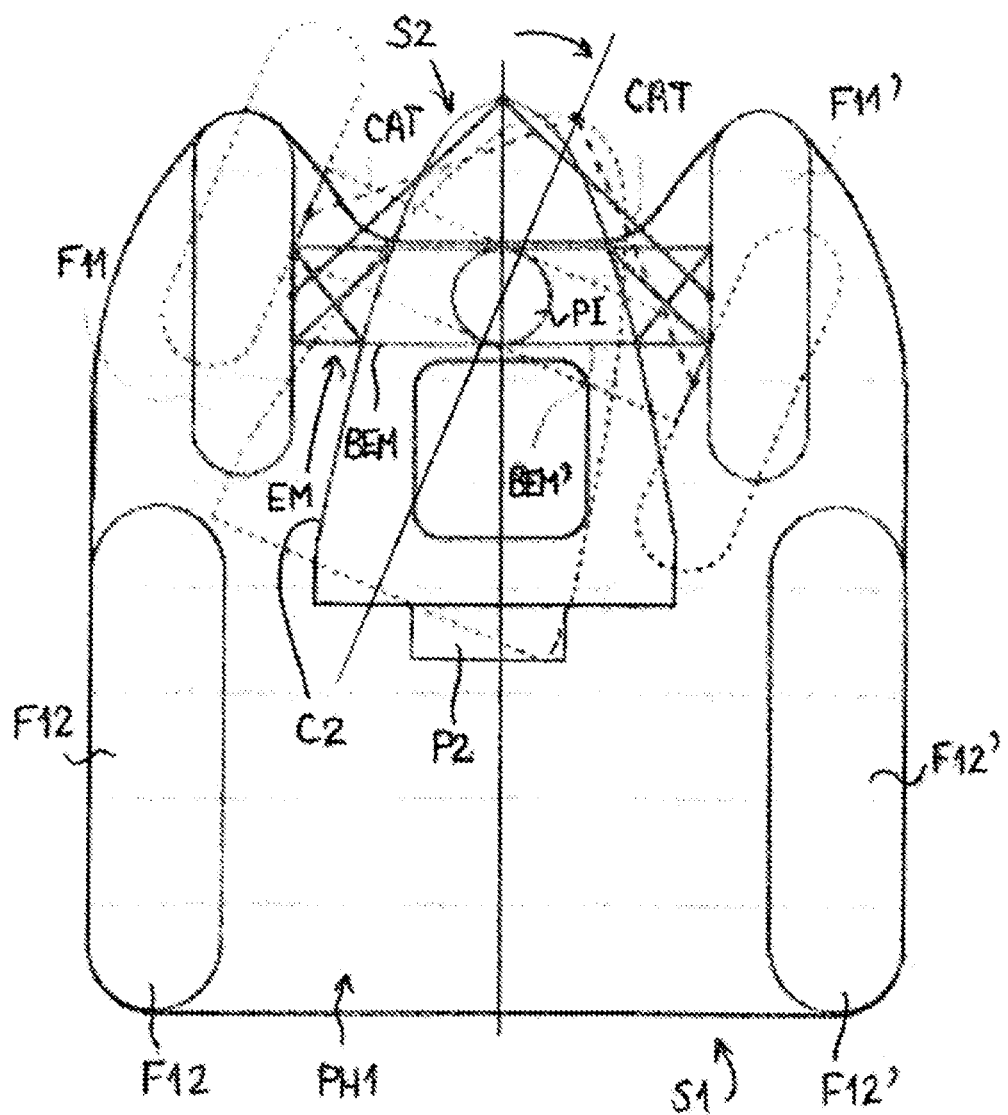

FIGS. 4 and 5 illustrate two embodiments where the buoyant structure S2 acts by traction on the buoyant structure S1.

In these embodiments, the structure S1 comprises two pairs of floats, namely a pair of fixed floats F12, F12' arranged toward the rear and a pair of movable floats F11, F11' arranged toward the front.

These movable floats are mounted on a mobile equipment item EM that is able to pivot relative to the fixed superstructure ST1 of the structure S1 around a pivot PI located substantially at the height of the floats F11, F11' in the front-back direction, this mobile equipment item comprising two rigid arms BEM1, BEM1' connecting the pivot PI to the floats.

The structures S1 and S2 are secured to one another by traction cables CAT, CAT', which, on structure S1 side, are attached to the mobile equipment item on either side of the pivot PI and, on structure S2 side, are attached to the rear transom thereof, spaced laterally apart. These cables here have a fixed length.

In this way, the changes in direction of the structure S2, caused by the changes in the thrust direction of the thruster P2, cause a change of direction in the same direction of the mobile equipment item EM, and the structure S1 is therefore capable of marrying a curve by regularly following the structure S1 during navigation.

In the embodiment of FIG. 5, the structure S2 is located practically in its entirety in the footprint of the structure S1, and the traction cables CAT no longer extend from the rear of the structure S1, but from its stem. It can also be seen that the distance between the movable floats F11, F11' is smaller than the distance between the fixed floats F12, F12', which gives the structure S1 greater handling on turns.

In all embodiments, it is advantageously provided that the securing between the structures S1 and S2 makes it possible to accept an attitude differential between two structures in pitch, in roll and in vertical translation.

Depending on the embodiment, these means may comprise ball-and-socket joints, Cardan joints, vertical slides, etc.

Furthermore, the electrical connection between the circuitry of the photovoltaic elements PH1 and the battery or batteries B2 may be done by any appropriate means (not shown, but well known by those skilled in the art), and in particular using connectors and cables closely associated with the securing members to facilitate the operations.

Figure 6:
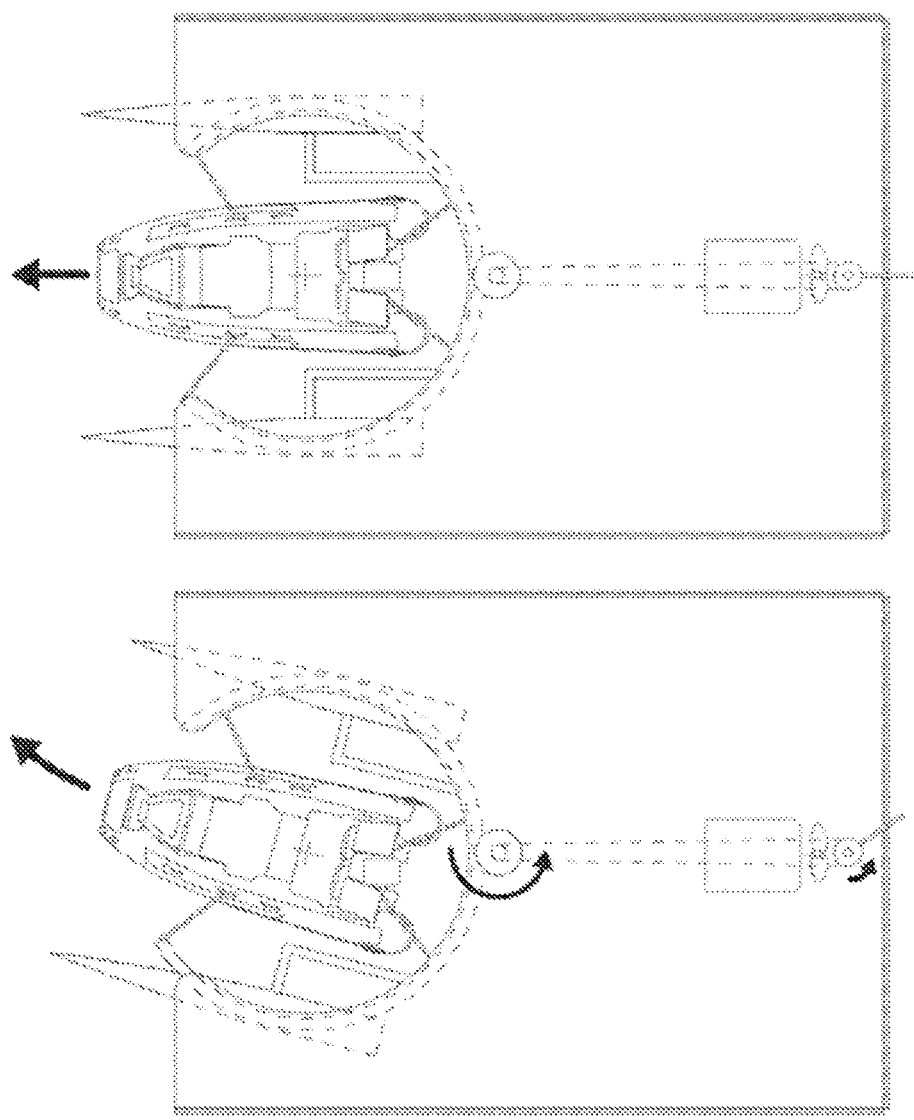
FIG. 6 is a schematic top view of an assembly according to a fifth embodiment.

FIG. 6 shows an improvement of the assembly schematically shown in FIG. 5, according to which the structure S2 acts mechanically on the angle of the rudder of the structure S1 when it makes a turn, thus facilitating the turn.

Figure 7:
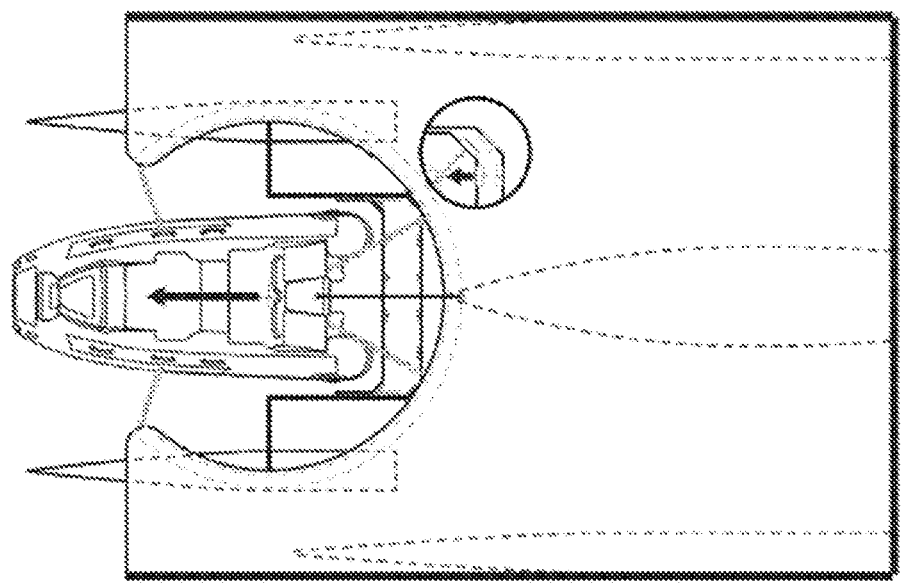
FIG. 7 is a schematic top view of an assembly according to a sixth embodiment.

FIG. 7 shows the same type of assembly as that of FIG. 6, but also with a mechanical fuse able to be triggered when the structure S2 exerts an excessive tractive force on the structure S1. When the mechanical fuse is triggered, the structure S2 pulls the structure S1 by a fixed point of the latter. The structure S2 places itself (engages itself, plugs itself) in the framework automatically when it rotates again. This mechanical fuse mechanism allows a lighter framework for the structure S1.

According to other embodiments, it is possible to use the securing solutions described thus far to move buoyant structures S1 of the trimaran type, and in particular structures of the Philippine "banca" type equipped with photovoltaic panels, the structure S2 placing itself in front of or behind the Philippine banca structure S1.

Figure 8:
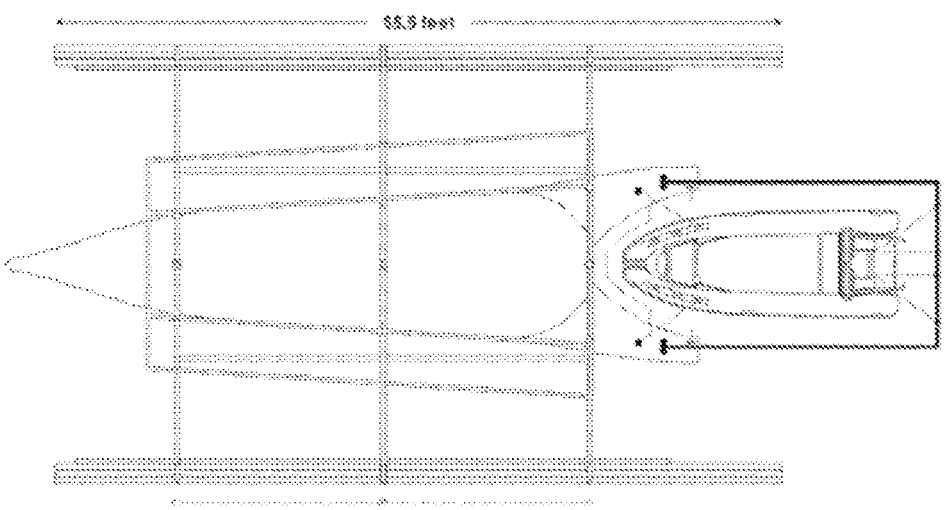
FIG. 8 is a schematic top view of an assembly according to a seventh embodiment.

FIG. 8 schematically shows a trimaran structure S1 (here of the Philippine banca type), the structure S2 being placed in the rear and pulling the structure S1 from a rectangular U-bar hoop, the latter being able to be raised by rotation (around points placed on an extension of the Philippine banca, at the rear of the latter). When the U-bar hoop is raised, the structure S2 can retract and deploy and, when it is restored (that is to say, once again placed horizontally), the structure S2 can be secured with the U-bar hoop so as to be able to pull the structure S1. FIG. 8 shows the U-bar hoop in the "cruising" position; later, FIGS. 11 to 15 show the U-bar hoop in various maneuvering steps.

Figure 9:
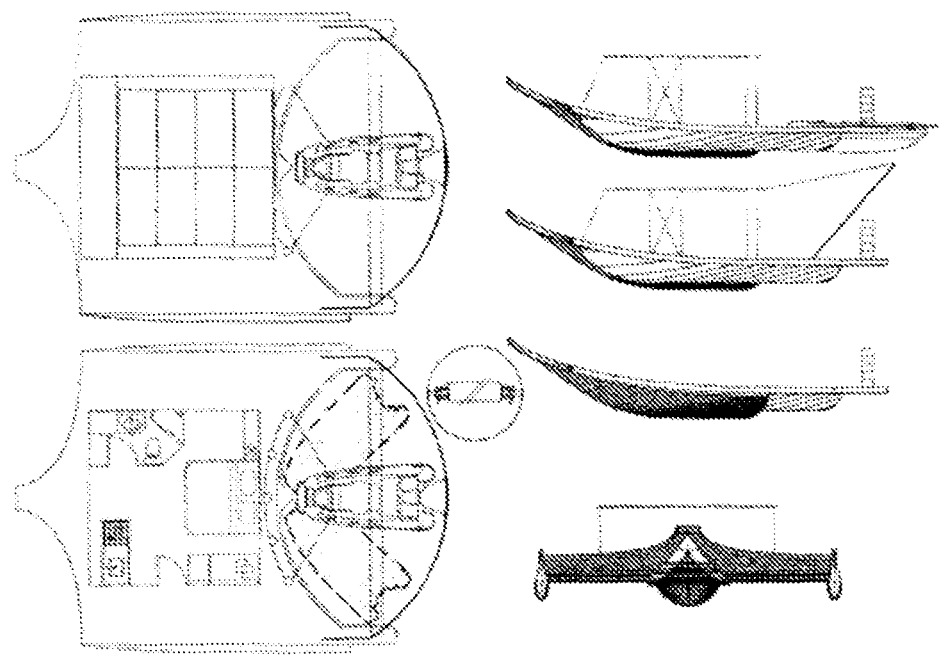
FIG. 9 shows different schematic views of an assembly according to an eighth embodiment.

FIG. 9 shows a trimaran structure S1 and a structure S2 placed behind the structure S1 and pulling it from an arc of circle-shaped U-bar hoop. The aim sought here is the following: to make a turn, so that the structure S2 can position itself optimally by "sliding" its securing means to the structure S1, along the U-bar hoop, that is to say, by performing a rotation in the horizontal plane. Here, the center of rotation (where the vertical axis is located around which the rotation is performed) is located in front of the structure S2; it will be seen later, in FIG. 16, that the center of rotation can advantageously be located at the center of the structure S2.

The right side of this figure shows the U-bar hoop when it is raised and the structure S2 is not in the U-bar hoop.

During a maneuver, the structure S2 can assume an angle relative to the main axis of the structure S1 to rotate it more effectively.

Advantageously, the securing means that pulls the U-bar hoop can roll freely (laterally) on the U-bar hoop except when the structure S1 pulls the U-bar hoop with a significant force. Thus, the structure S2 can change its angle relative to the main axis of the structure S1 when it decelerates. Furthermore, the technology of automobile seatbelts (winder+attachment members+blocking in case of abrupt tensioning) is used to allow the cords to wind on the pulleys shown in the figures only if there are no jolts.

The idea here is only to allow a maneuver to be initiated (that is to say, to allow the securing means to wind on the arc of circle-shaped U-bar) if the structure S2 does not pull the structure S1 strongly and if there are no jolts. The driver of the structure S2 can thus distinguish 1. the step of "initiating a maneuver" of running the engine to assume an angle (but without accelerating sharply), from 2. the step of running the engine (in the opposite direction this time) to accelerate by rotating the assembly.

Figure 10:
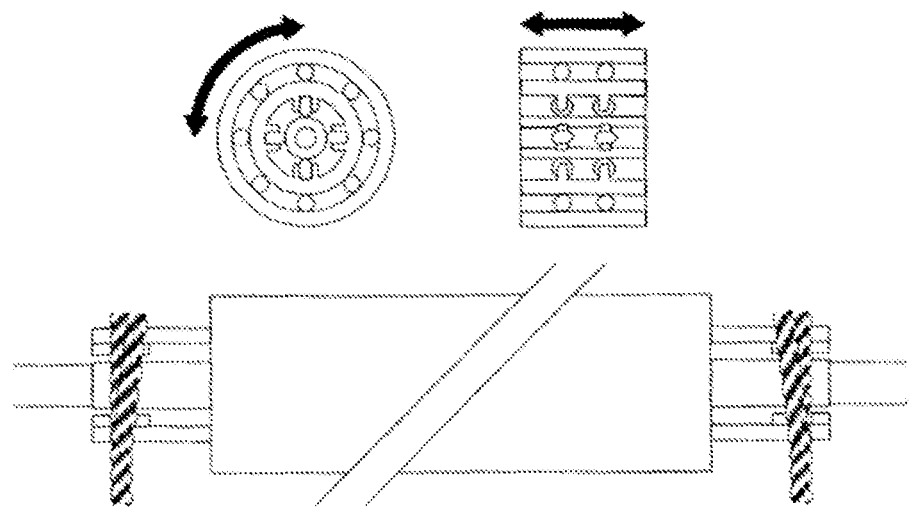
FIG. 10 shows different views of an attachment mechanism on the hoop (U-bar) according to the eighth embodiment of the invention.

FIG. 10 shows a detail of the securing of the structure S2 with the U-bar hoop (corresponding to the detail shown in FIG. 9 in a circle), implemented in the form of a mechanism called "fastener" hereinafter, which prevents the securing means from moving laterally when the structure S2 pulls with a significant tractive force, but allows it to move laterally to perform a maneuver.

FIG. 10 shows small wheels allowing the fastener to move laterally on the U-bar hoop and ball bearings allowing it to rotate freely around the U-bar hoop.

To begin a maneuver aiming to rotate the structure S1 from a certain side, the driver of the structure S2 performs the following steps:

1) decelerates (so that there is no longer a significant tractive force);
2) accelerates, but not too much, so that the fastener can move laterally on the U-bar, by rotating the engine from the opposite side from what he would do normally, so as to position the structure S2 on the most advantageous side to rotate the assembly;
3) accelerates by rotating the engine in the opposite direction (to advance the assembly by rotating), then, when the turn is completed;

4) decelerates and performs the reverse of step 2 in order to reposition the fastener in the middle of the U-bar (that is to say, to reposition the structure S2 in the main axis of the structure S1).

Figure 11:
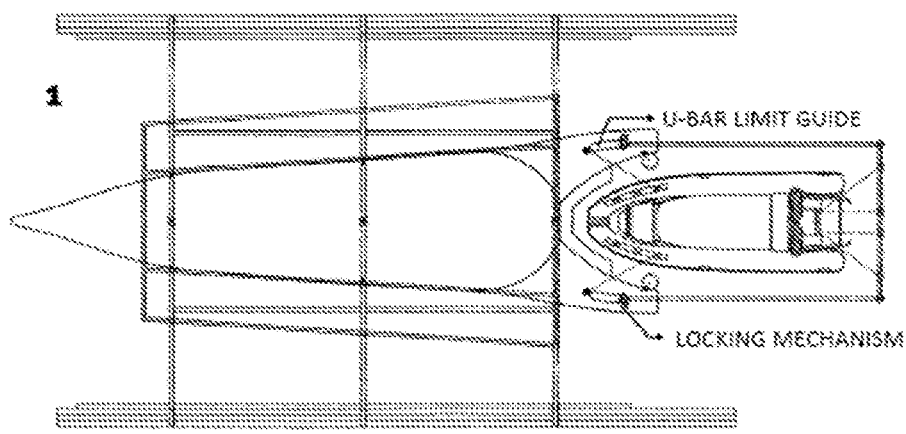
FIG. 11 to 15 show the maneuvering steps for the seventh embodiment of the invention.
Figure 12:
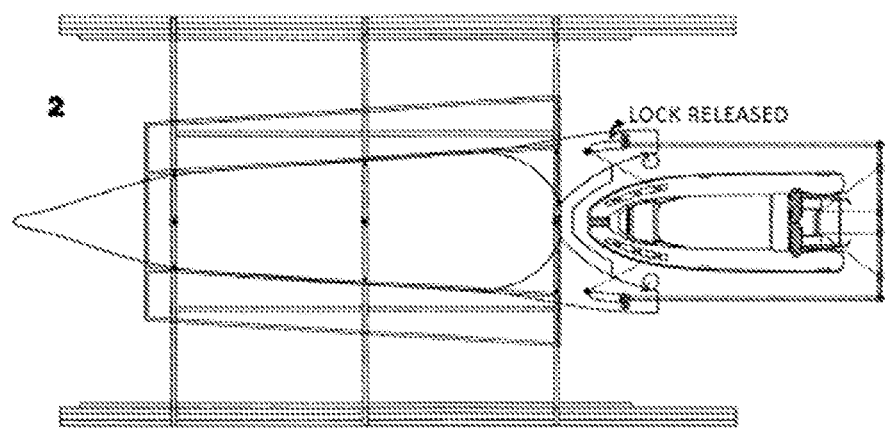
Figure 13:
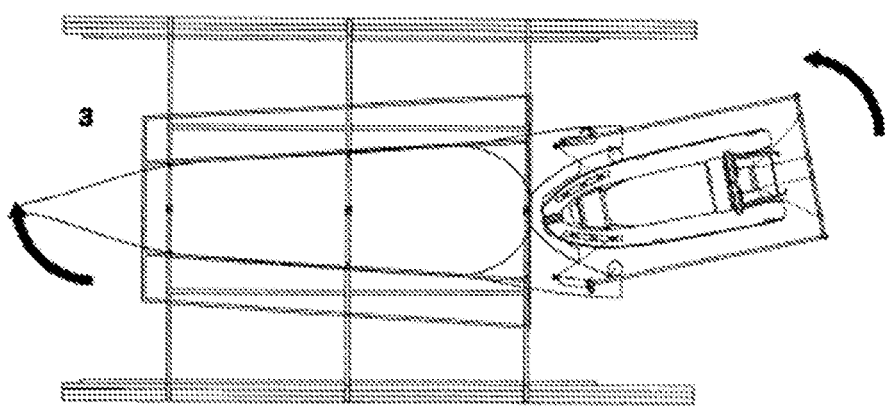
Figure 14:
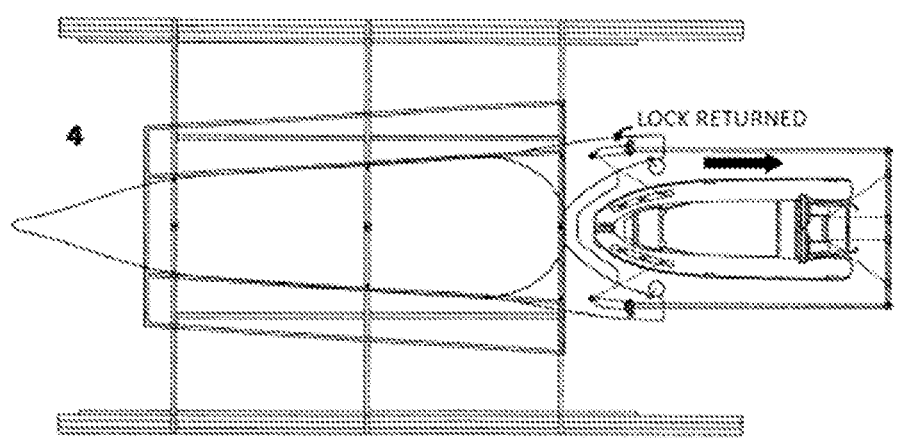
Figure 15:
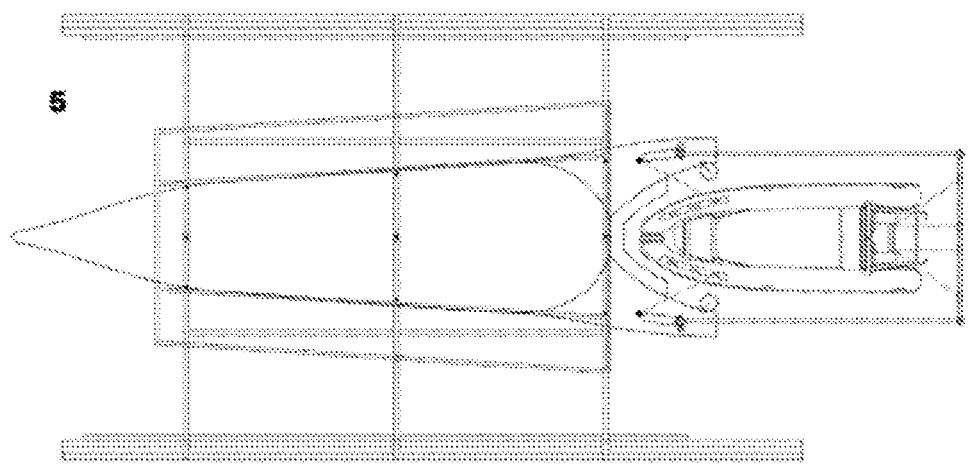

FIG. 11 shows a maneuvering mechanism using the rectangular U-bar hoop of FIG. 8. The fastener of the latter on the structure S1 can slide at the beginning of a maneuver. A latch is unlocked to allow it, as shown in FIG. 12. Next, the driver of the second structure runs the engine (thruster) first in the direction opposite what he would normally do for the turn that he intends for the assembly to make and operates it until the hoop is positioned to make said turn, as shown in FIG. 13; next, rotates it in the opposite direction, that is to say, positions it normally to make this turn and operates it until the turn is completely performed. Lastly, as shown in FIG. 14, the driver of the second structure operates the engine in reverse to return the U-bar hoop to the cruising position (FIG. 15).

Figure 16:
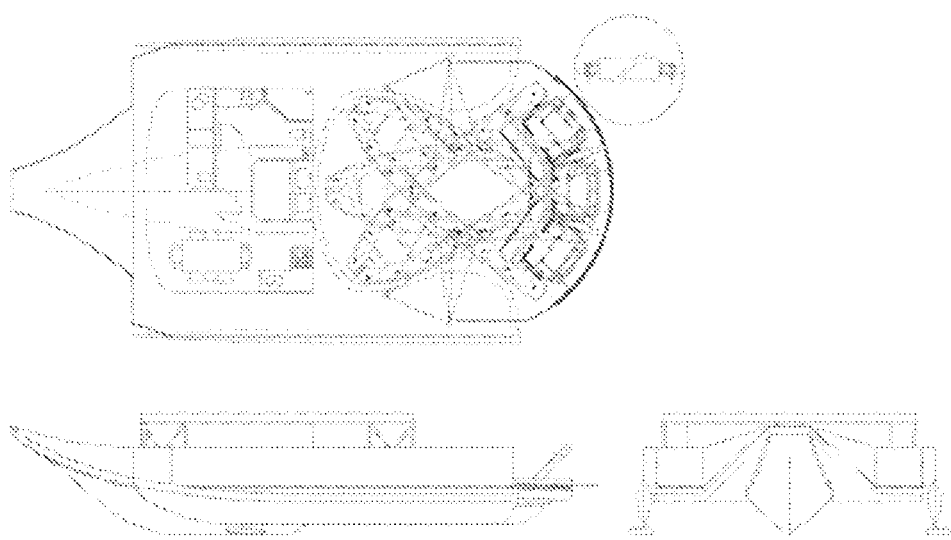
FIG. 16 shows different schematic views of a variant of the eighth embodiment shown in FIG. 9.

FIG. 16 shows a variant of the assembly shown in FIG. 9, in which the center of rotation (about a vertical axis) is located at the center of the structure S2 (rather than in front of the structure S2). This variant is advantageous in that it makes it possible to integrate a larger structure S2 into the footprint of the structure S1.

Figure 17:
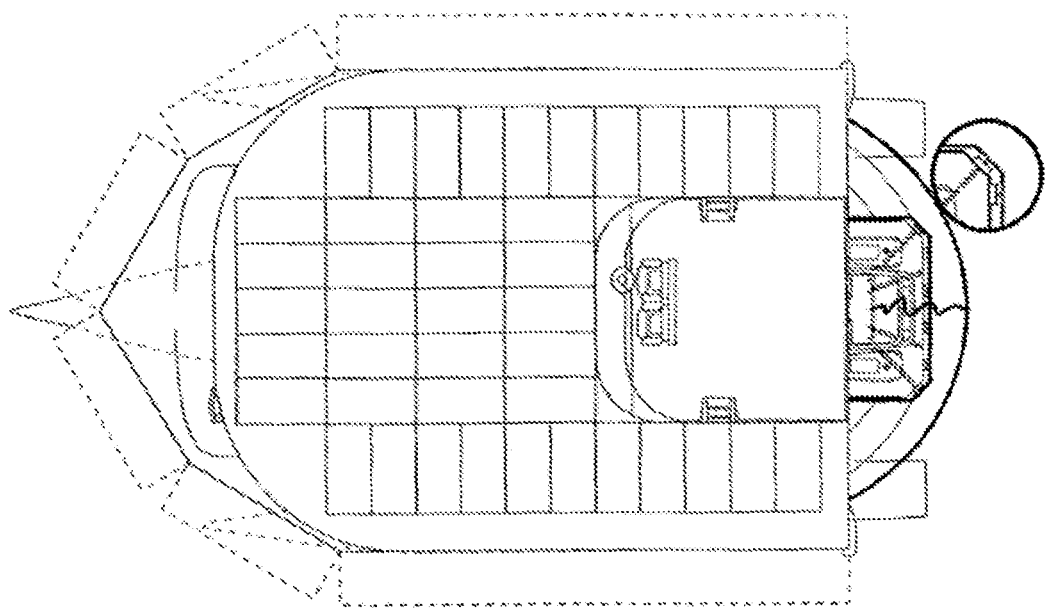
FIG. 17 is a schematic top view of an assembly according to a tenth embodiment.

FIG. 17 shows an assembly comprising two U-bar hoops, the first being provided with a mechanical fuse and the second making it possible to retain the structure S2 in the case where the mechanical fuse is triggered and causes the structure S2 to no longer be retained by the first one.

Figure 18:
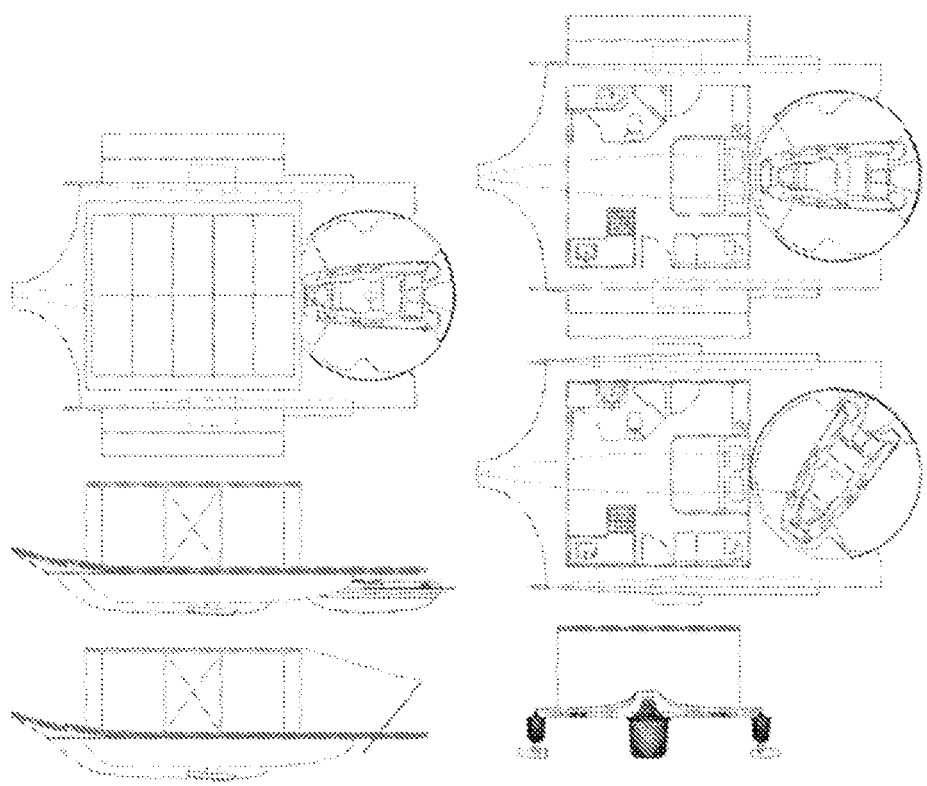
FIG. 18 shows different schematic views of an assembly according to an eleventh embodiment.

FIG. 18 shows a U-bar hoop in the form of a nearly complete circle.

Figure 19:
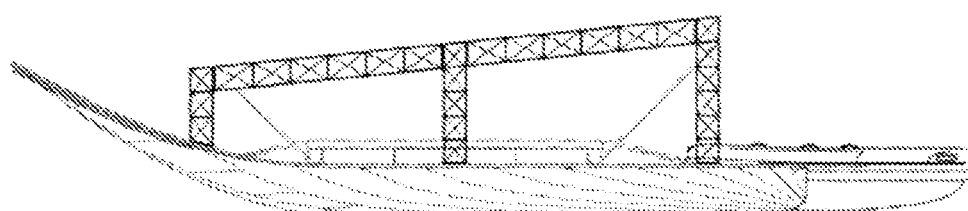
FIG. 19 is a schematic side view of an assembly according to a twelfth embodiment.

Lastly, FIG. 19 illustrates the design of the superstructure (ST1) of the first structure in which the solar roof is non-horizontal, so as to oppose less wind resistance.

In FIGS. 20 to 23, reference S1 refers to the first buoyant structure, with a superstructure ST1 and two floats F1, F1' leaving a space E1 between them between the superstructure ST1 and the water level, in which space the structure S2 can be secured. The superstructure ST1 and the inside of the floats can also comprise all living, sleeping, working, etc. arrangements. The superstructure ST1 comprises a set of four transverse beams, respectively PO0 to PO4, rigidly connecting the floats F1 and F1' together. The beam PO0 extends at the height of the floats in the front region thereof, while the beams PO1 to PO4 are generally in the shape of an inverted U and extend at a higher level than the apices of the two floats.

Figure 23:
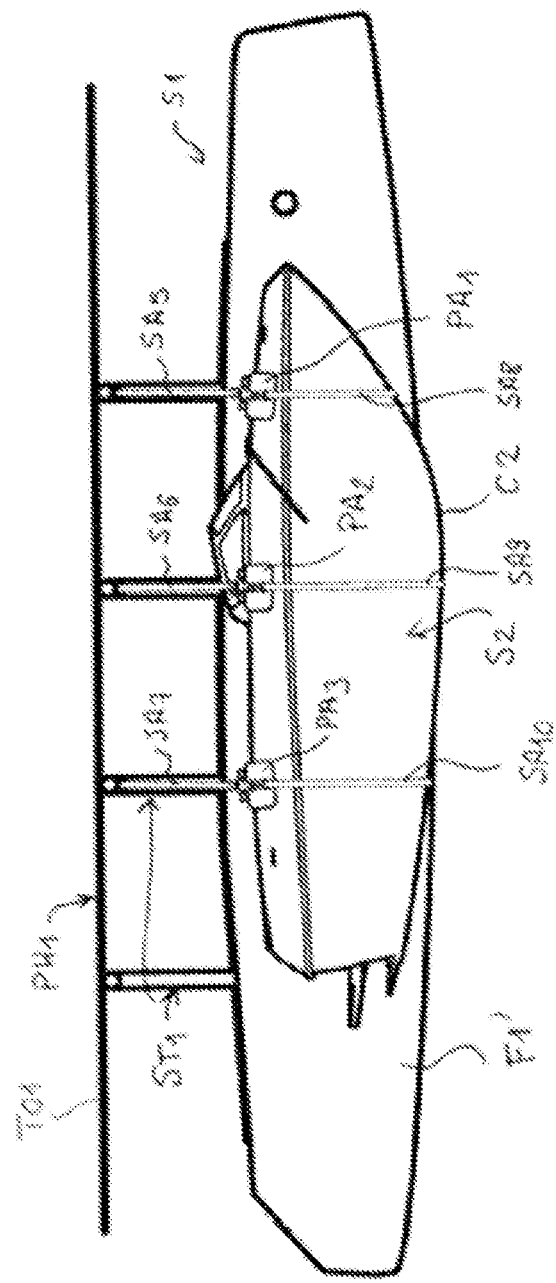
FIG. 23 is a side view of the assembly of FIGS. 20 to 22.

As shown in particular in FIG. 23, the structure S1 comprises, on a structure forming a roof TO1, secured to the superstructure ST1, a set of photovoltaic panels PH1 here covering its entire expanse.

The structure S2 can be releasably secured to the structure S1 on the one hand by a suspension device and on the other hand by a lateral retaining device.

The suspension device comprises a first set of straps SA5-SA7 and SA5'-SA7', respectively, which are attached to the beams PO1 to PO3 in their central region, using appropriate hooks, and which connect these hooks to sets of lateral pads PA1-PA3 and PA1'-PA3', respectively. These pads have a generally L-shaped cross-section and extend at the transition between the deck of the structure S2 and its hull C2 while being freely attached thereto.

These pads preferably comprise developments (foam, elastomer, etc.) intended to prevent the surfaces of the structure S2 from deteriorating.

The suspension device comprises a second set of straps SA8 to SA10 extending below the structure S2, along its hull C2, between two pads located at the same level in the front-back direction (see in particular FIG. 23).

Using a set of strap stretchers TS of a type known in itself, the straps of the suspension device can be tensioned so as to attach the structure S2 to the structure S1 at the central regions of the beams PO1 to PO3 of the superstructure ST1 belonging to the structure S1, the pads serving as a link between the upper straps SA5 to SA7 and SA5' to SA7' and the lower straps SA8 to SA10.

Figure 21:
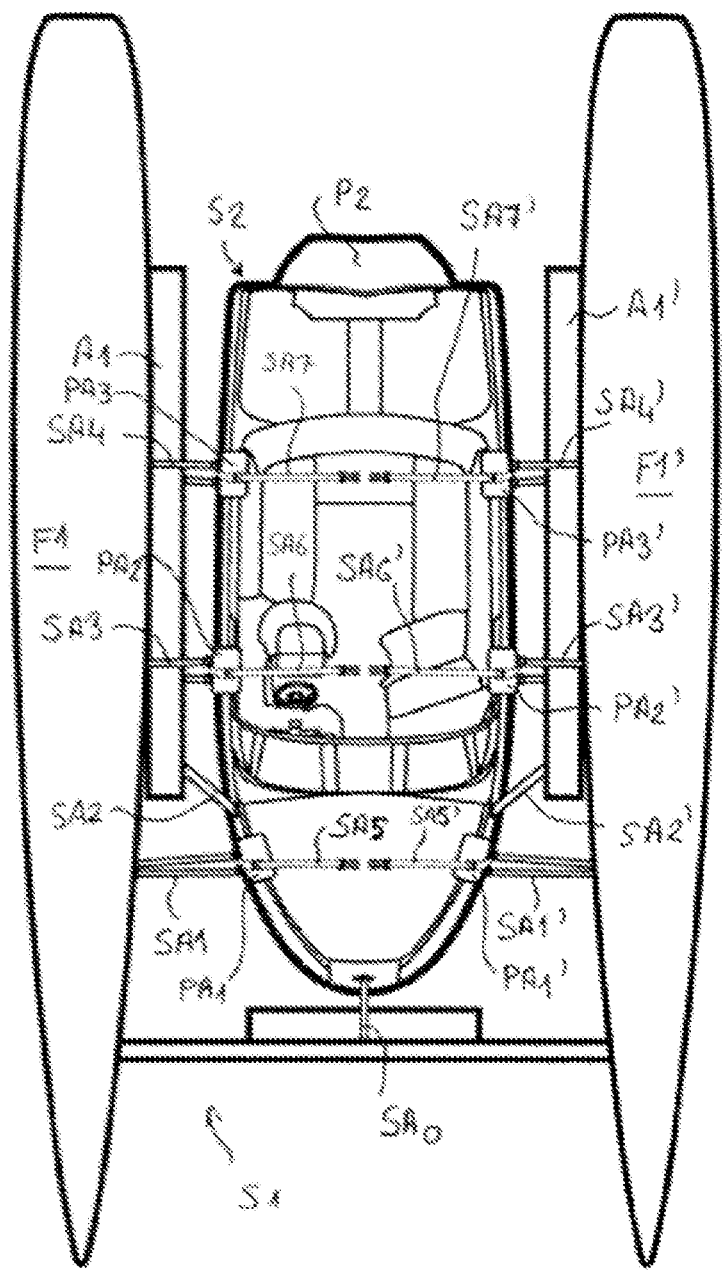
FIG. 21 is a schematic top view of the assembly according to FIG. 20, without its superstructure.
Figure 22:
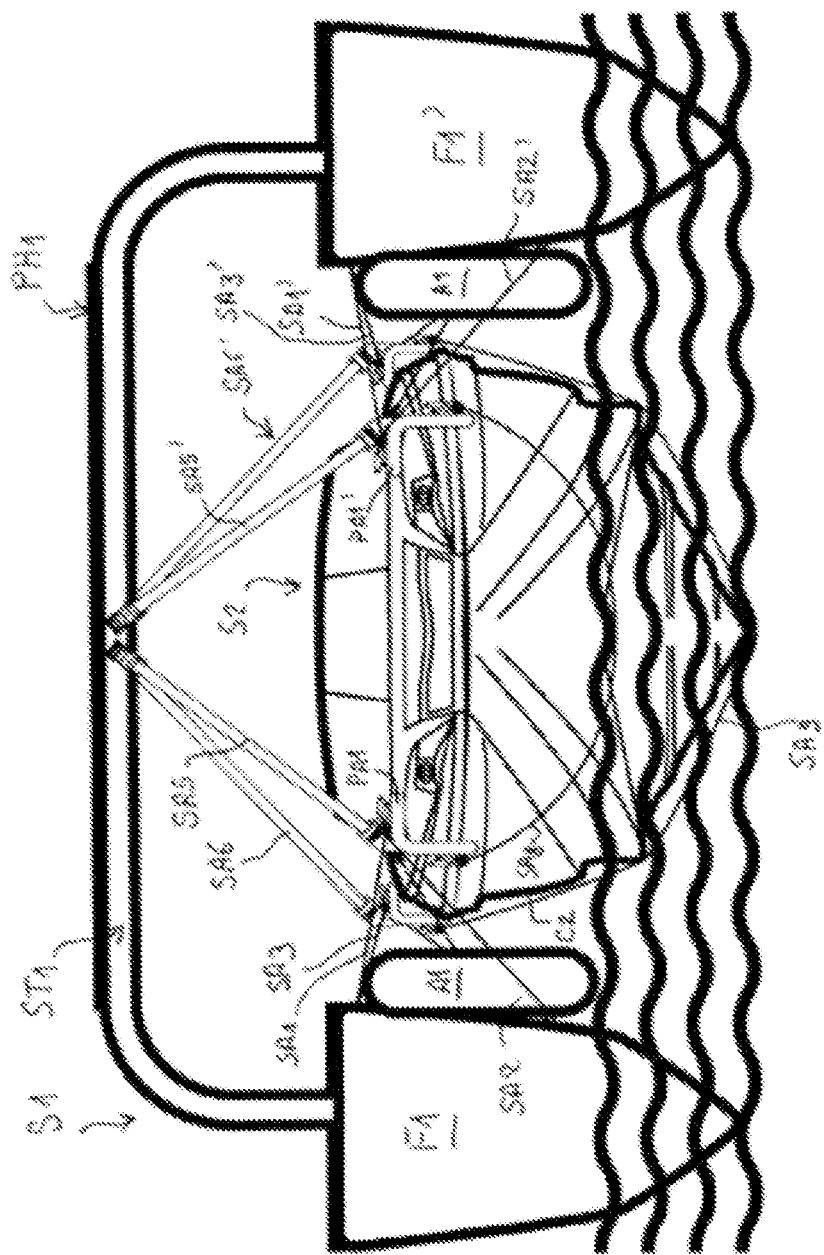
FIG. 22 is a front view of the assembly of FIGS. 20 and 21.

The link between the two structures S1 and S2 also comprises a lateral retaining device here comprising a set of straps SA0, SA1 to SA4 and SA1' to SA4' (see in particular FIG. 21).

The strap SA0 extends between the bow of the structure S2 and the front beam PO0, essentially horizontally and along the navigation axis of the structures.

A pair of straps SA1, SA1' extends from the front region of the structure S2, near the pads PA1, PA1', respectively (or from the pads in question), angled toward the rear toward the two floats that comprise the appropriate fastening arrangements.

Three other pairs of straps SA2, SA2', SA3, SA3' and SA4, SA4' extend between the respective pads PA1, PA2 and PA3 and PA1', PA2' and PA3', and the respective floats F1 and F1', the latter comprising substantially suitable fastening means in line with the beams PO1, PO2 and PO3.

It is understood that tensioning the straps makes it possible on the one hand to transmit, to the buoyant structure S1, the thrust exerted by the thruster of the buoyant structure S2 (primarily via the straps SA1 and SA1' that are oriented obliquely and dimensioned accordingly), and on the other hand to stabilize the structure S2 laterally relative to the structure S1.

As is the case in general, the thruster is able to cause the second structure to rotate by a certain angle about an axis parallel to its longitudinal axis (that is to say, about an axis parallel to its path), and the straps also serve to transmit the rotational force to the assembly.

Figure 20:
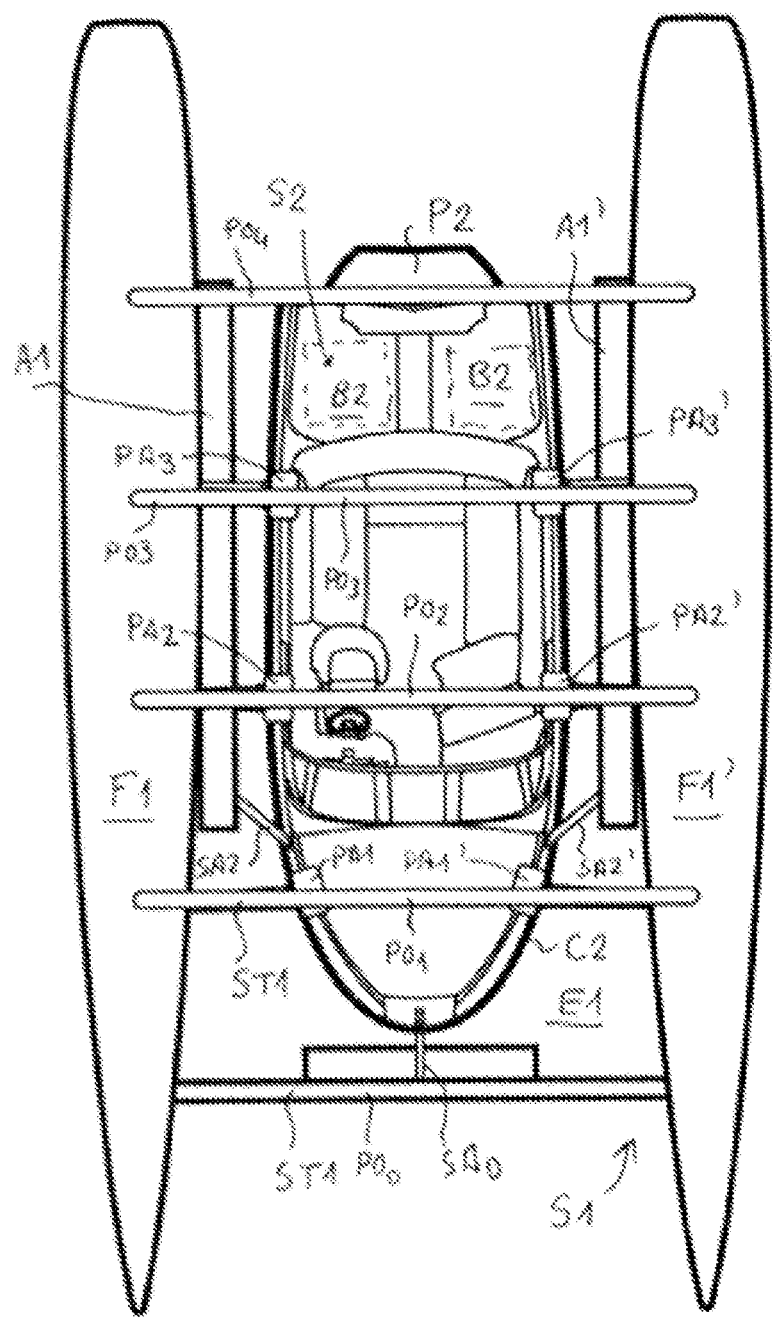
FIG. 20 is a schematic top view of an assembly according to a thirteenth embodiment, with its superstructure but without its roof.

FIGS. 20 and 21 show shock absorbers A1, A1' provided on the structure S1 and for example made from elastomer or foam or using the same techniques as fenders, extending along the floats F1 and F1' inside the latter and making it possible to absorb any impacts between the two structures, in particular during the securing and undocking phases.

The structure S2 is secured to the structure S1 by the following steps:
engaging the structure S2 in the space E1 between the floats of the structure S1;
placing sets of pads on the structure S2,
placing the lower straps SA8-SA10 below the hull C2 of the structure S2 and fastening the straps to the respective pairs of pads, and pre-tightening the straps;
fastening the suspension straps SA5-SA7 and SA5'-SA7' on the respective pads and the respective beam hooks, and pre-tightening,
fastening and pre-tightening the front strap SA0 and the lateral straps SA1-SA4 and SA1'-SA4',
final tightening of the various straps.

Undocking is done through the reverse operations.

According to a variant that is not shown, the various straps can be combined with one another, by going through appropriate strap passages, so as to limit the number of tightening operations and to facilitate securing and undocking.

The assembly also comprises electrical connection means between the two structures, allowing the photovoltaic panels of the structure S1 to charge the batteries of the structure S2.

These electrical connection means can for example be made up of a flexible cable provided with an appropriate connector, belonging to the structure S1, the connector being engaged in a complementary connector in the hull or the deck of the structure S2.

Figure 24:
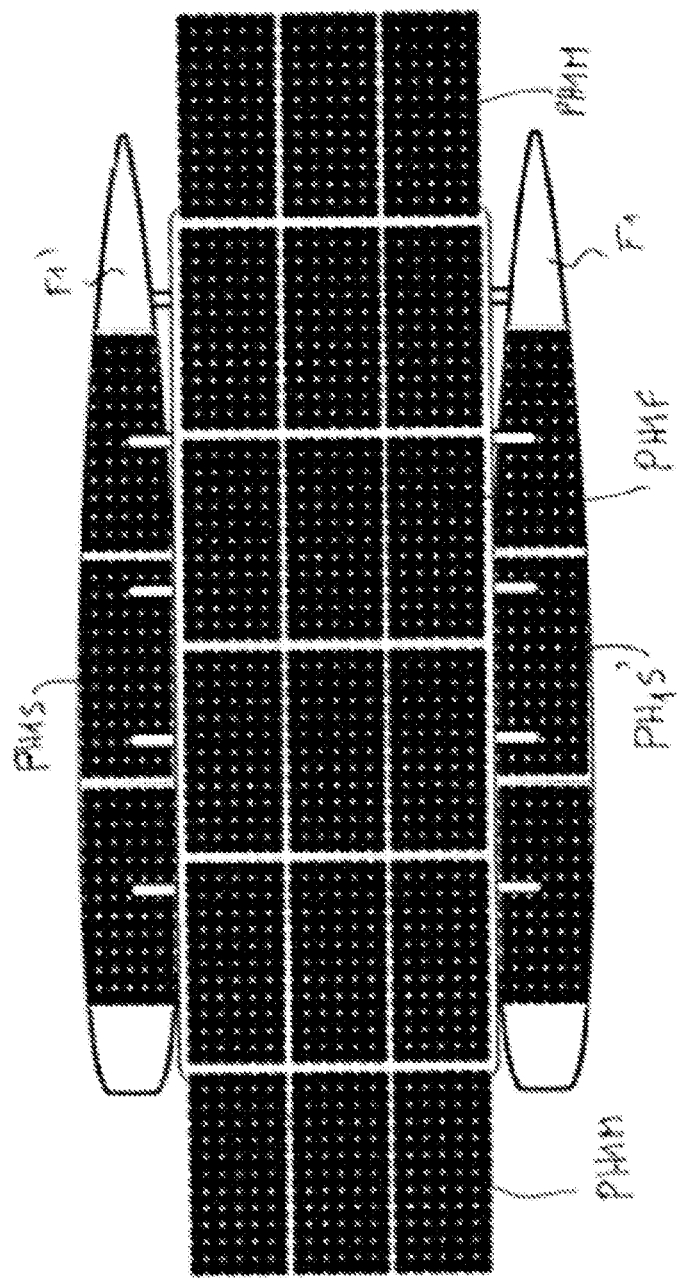
FIG. 24 is a schematic top view of the assembly of FIGS. 20 to 22 with a particular arrangement of a roof provided with photovoltaic panels.
Figure 25:
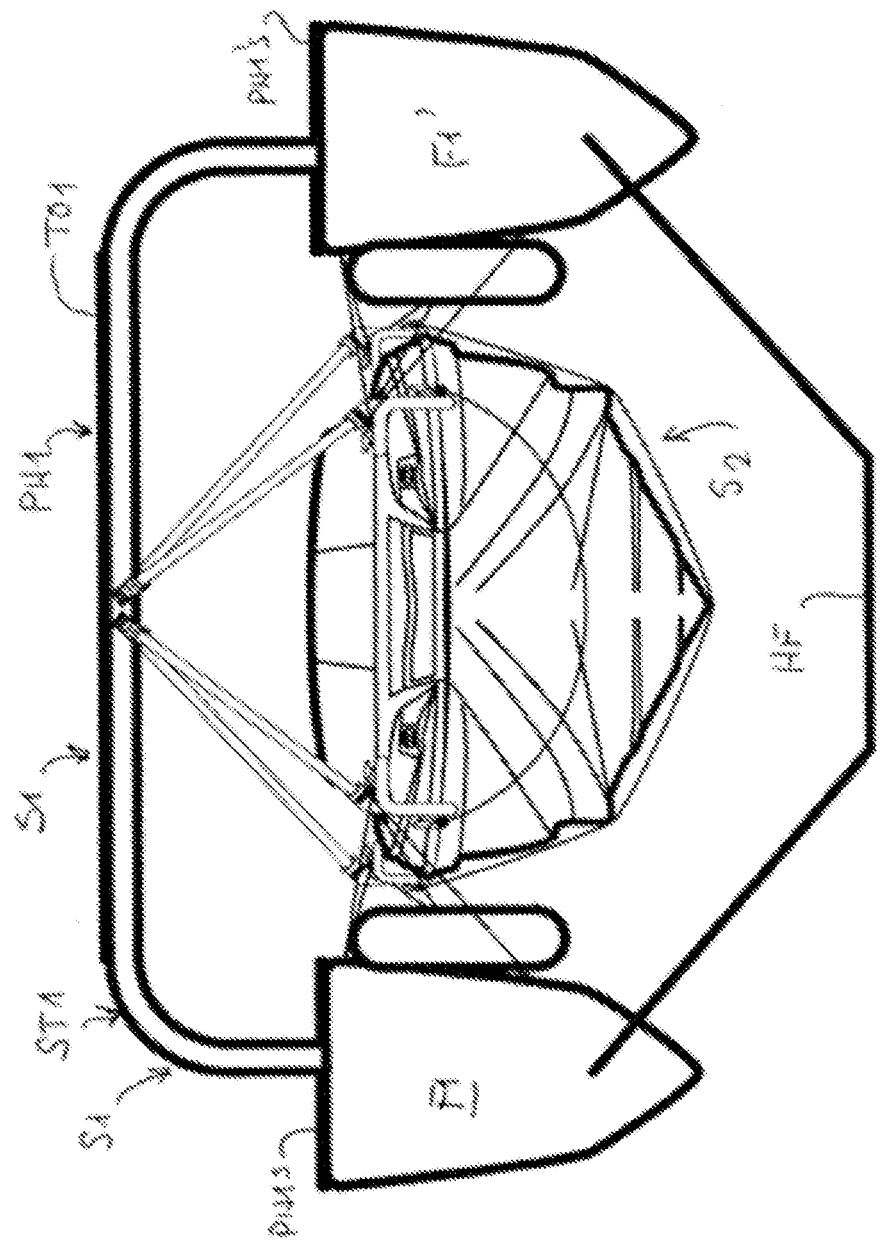
FIG. 25 is a front view of a variant of the assembly of FIGS. 20 to 24.

In reference now to FIG. 24, an improved structure is shown for the photovoltaic panels equipping the buoyant structure S1.

These panels PH1 comprise a set of fixed panels PH1F here occupying most of the roof of the buoyant structure, and a set of mobile panels PH1M fastened on a flat mobile structure able to be selectively retracted below the structure of the fixed panels, or deployed to protrude past the fixed panels and thus to increase the electrical production capacity of the panels.

In the present example, the mobile structure is able to be deployed toward the front and toward the rear relative to the fixed structure. A lateral deployment is also possible.

It is also possible to provide secondary photovoltaic panels PH1S on the floats, as illustrated.

Figure 26:
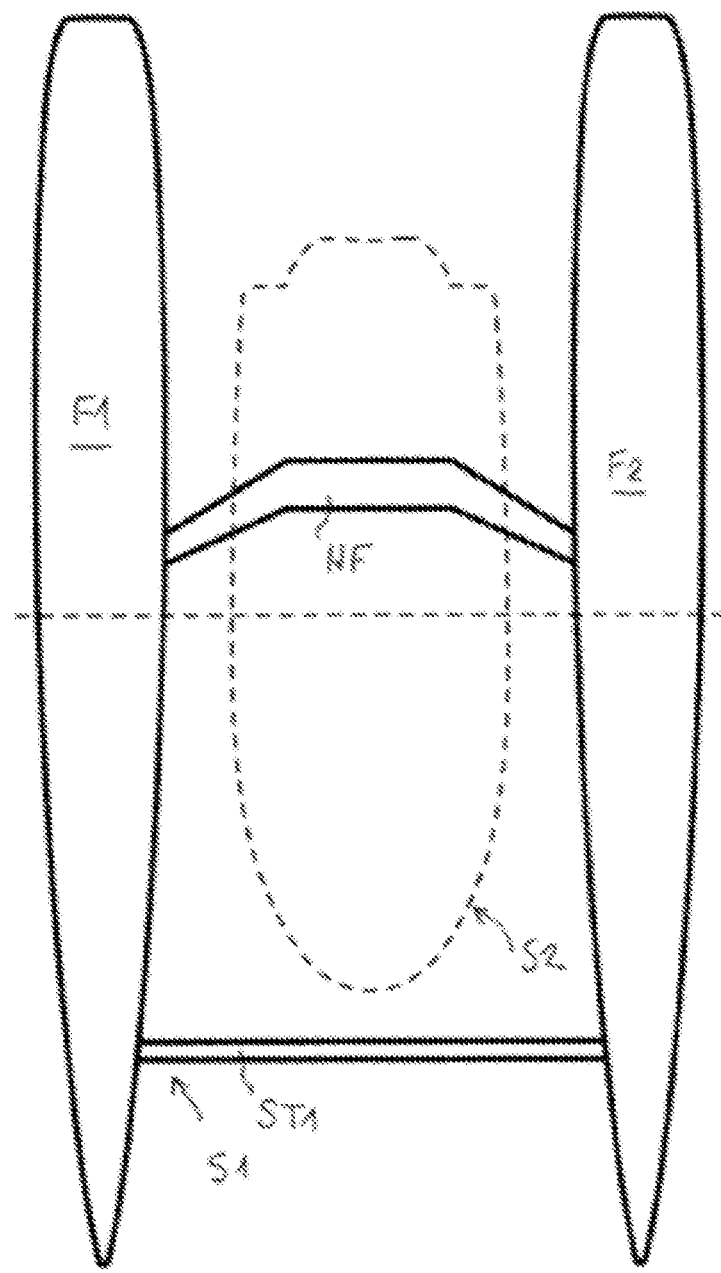
FIG. 26 is a partial top view of the first buoyant structure of the assembly of FIG. 25.
Figure 27:
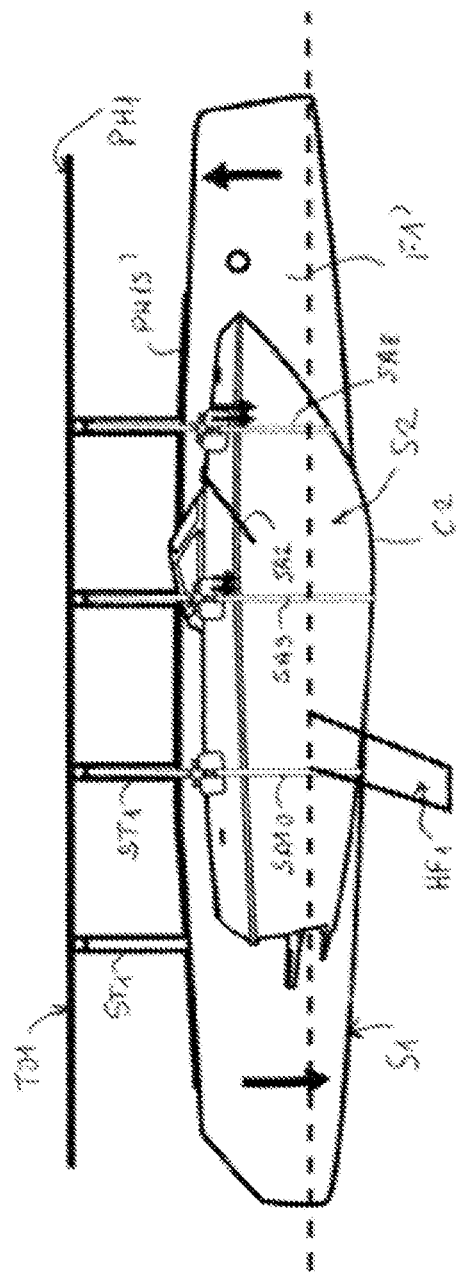
FIG. 27 is a side view of the assembly of FIGS. 25 and 26.

In reference now to FIGS. 26 and 27, a variant of the thirteenth embodiment is shown where the buoyant structure S1 is provided with a hydrodynamic element of the hydrofoil type HF, this element extending between the two floats F1 and F1' so as to be located underwater during navigation.

This hydrodynamic element comprises a horizontal central part and two lateral oblique parts connecting the central part to the respective floats.

Advantageously, it is possible to provide that the position of the structure S2 relative to the structure S1 is adjustable, so as to be able to adjust, during navigation where the thruster of the structure S2 ensures the propulsion of the assembly, the pulling up of each of the two structures so as to optimize the navigation conditions in particular regarding drag.

FIGS. 28 to 31 illustrate a fourteenth embodiment of the invention, according to which the floats F1, F1 of the first structure S1 are designed to ensure the land transport of the second structure S2, still made up here of a conventional single-hull boat with electric propulsion.

In this embodiment, each float F1, F1' is connected to the superstructure ST1 by a hinged link, respectively LA1 and LA1', the hinge being made about an axis, respectively AX1 and AX1', parallel to the axis of advance of the structure S1. This hinged link comprises means for locking in determined angular positions, as will be seen hereinafter.

Furthermore, each of the floats F1, F1' comprises a tight buoyancy tank CE1, CE1', which may be selectively filled with water or air, for example means similar to those used for the ballasts of a submarine. These buoyancy tanks thus have associated valves VA1, VA1' allowing their inner space to be placed in communication with the aquatic environment, and compressed air circuits CA1, CA1' allowing their inner space to be filled with air from a compressed air source (a compressor, not shown).

Each of the floats also comprises one or several outer lateral recesses, respectively EC1, EC1', (each) forming a housing for a respective wheel RO1, RO1' making it possible to roll the assembly formed by the structures S1 and S2, the structure S1 bearing the structure S2 from which it is suspended, on the shore. The wheels are oriented such that, in the normal position of the floats illustrated in FIGS. 28 and 29, they rotate about a respective vertical wheel axis, respectively AR1, AR1', while protruding by a determined distance, laterally, past the outer edge of the considered float.

Figure 28:
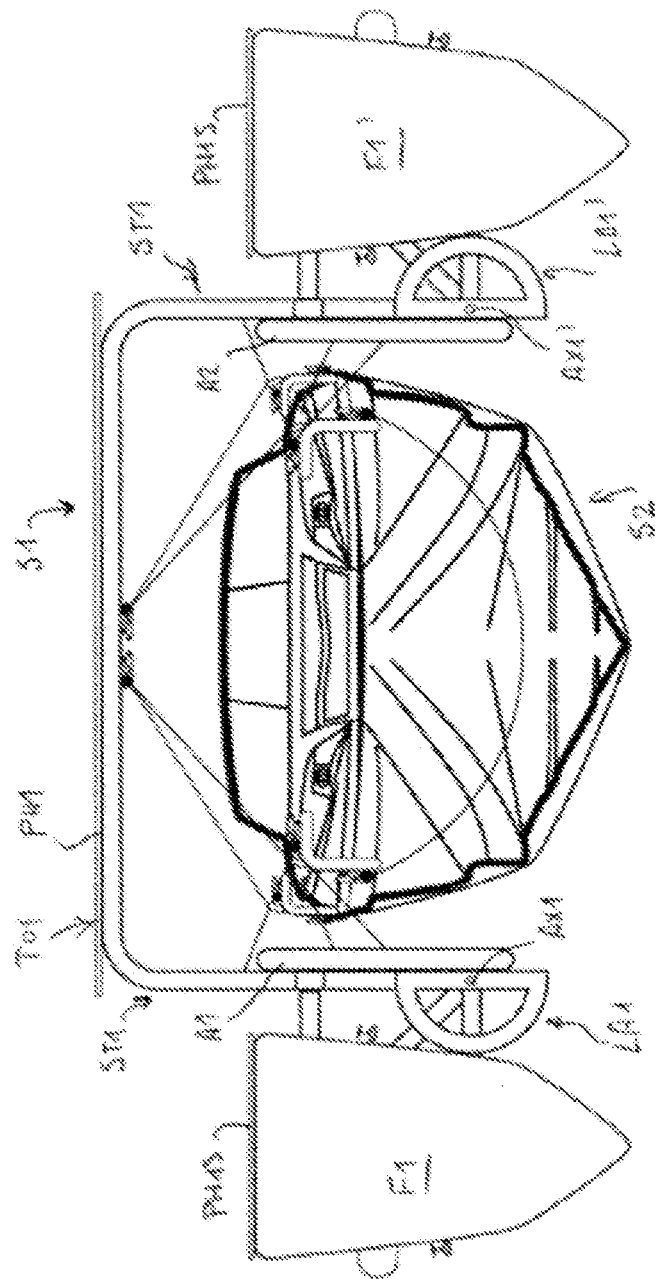
FIG. 28 is a front view of an assembly according to a fourteenth embodiment of the invention, in a first state of the first structure.

FIG. 28 illustrates the assembly in a navigation situation. The buoyancy tanks CE1, CE1' are filled with air and ensure the flotation of the structure S1, in the same way as a traditional catamaran. The hinged links LA1, LA1' are locked so that the floats F1 and F1' form a rigid assembly with the superstructure ST1. Stop arms BU1, BUA' laterally pressing each float F1, F1' against a facing part of the superstructure ST1 make it possible to limit the forces applied to the hinged link.

Figure 29:
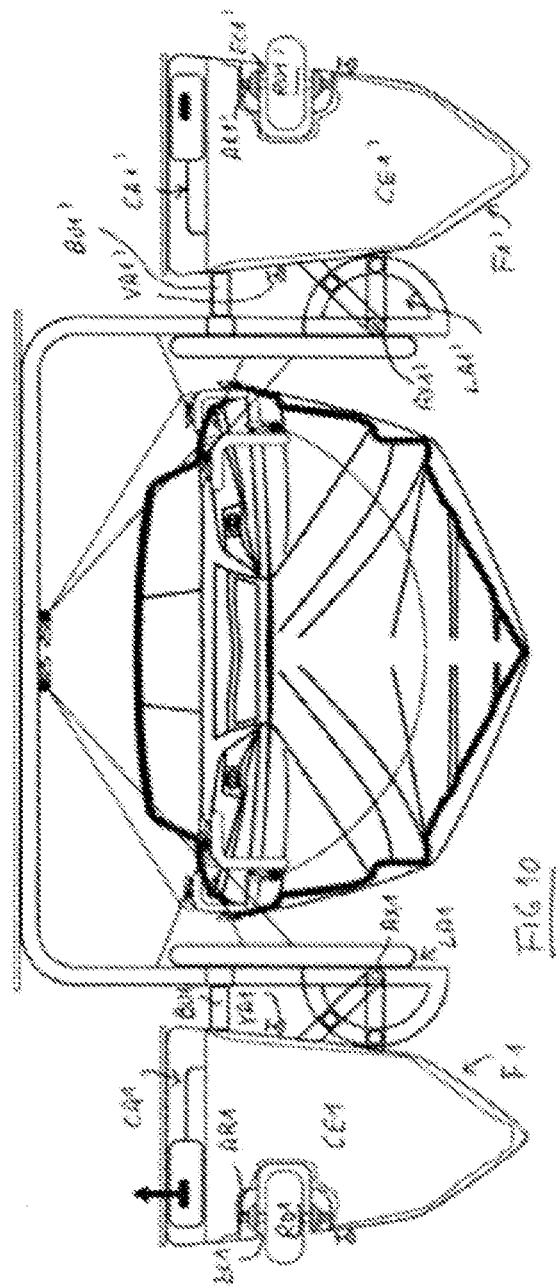
FIG. 29 is a front view with partial cutaway of the assembly of FIG. 28, in the same first state.
Figure 30:
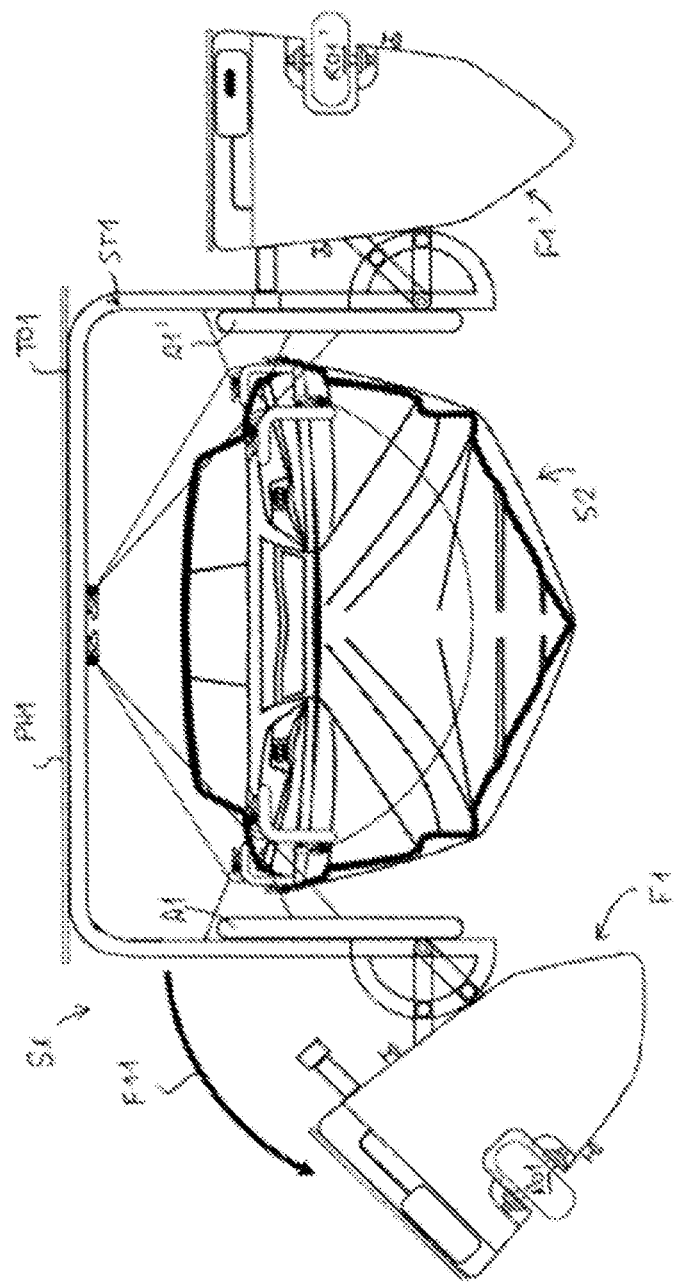
FIG. 30 is a front view similar to that of FIG. 29, one of the floats being in an intermediate state.

In reference to FIG. 29, the valves VA1, VA1' are open to allow water to enter the tight buoyancy tanks CE1, CE1', the air being expelled via appropriate gates provided for example at the compressed air circuits.

Figure 31:
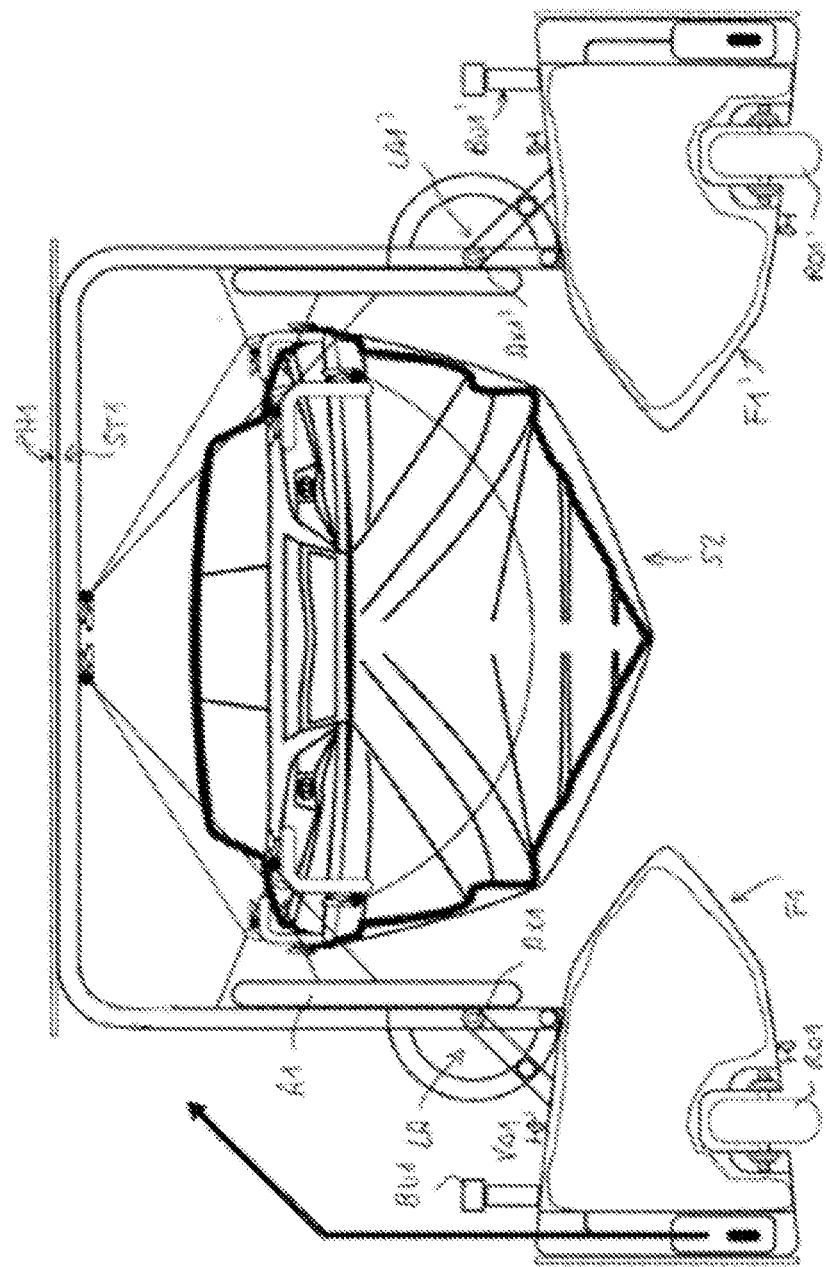
FIG. 31 is a front view similar to that of FIG. 29, in a second state of the first structure.

During this phase (in the beginning, at an intermediate moment or at the end), the locks of the hinged links LA1, LA1' are released and the floats can switch (cf. arrow F11 in FIG. 30), under the effect of their own weight filled with water or with assistance (jacks or motors), to the position of FIG. 31, where the hinged links LA1, LA1' are locked in this position.

It can be seen that the wheels RO1, RO1' then protrude downward, and the assembly then turns into a rolling assembly making it possible to bring the boat making up the structure S2 onto the shore. This can be done either manually or with a tractive unit, or by motorizing the wheels RO1, RO1'.

The transition between the situation of FIG. 28 and that of FIG. 31 takes place while the assembly is floating near the shore, with a sufficient depth to allow the downward movement of the floats F1, F1', without the wheels then touching the bottom. In this situation, the thruster P2 of the boat S2 can be used to bring the assembly close to the shore and to begin dry docking.

Figure 32:
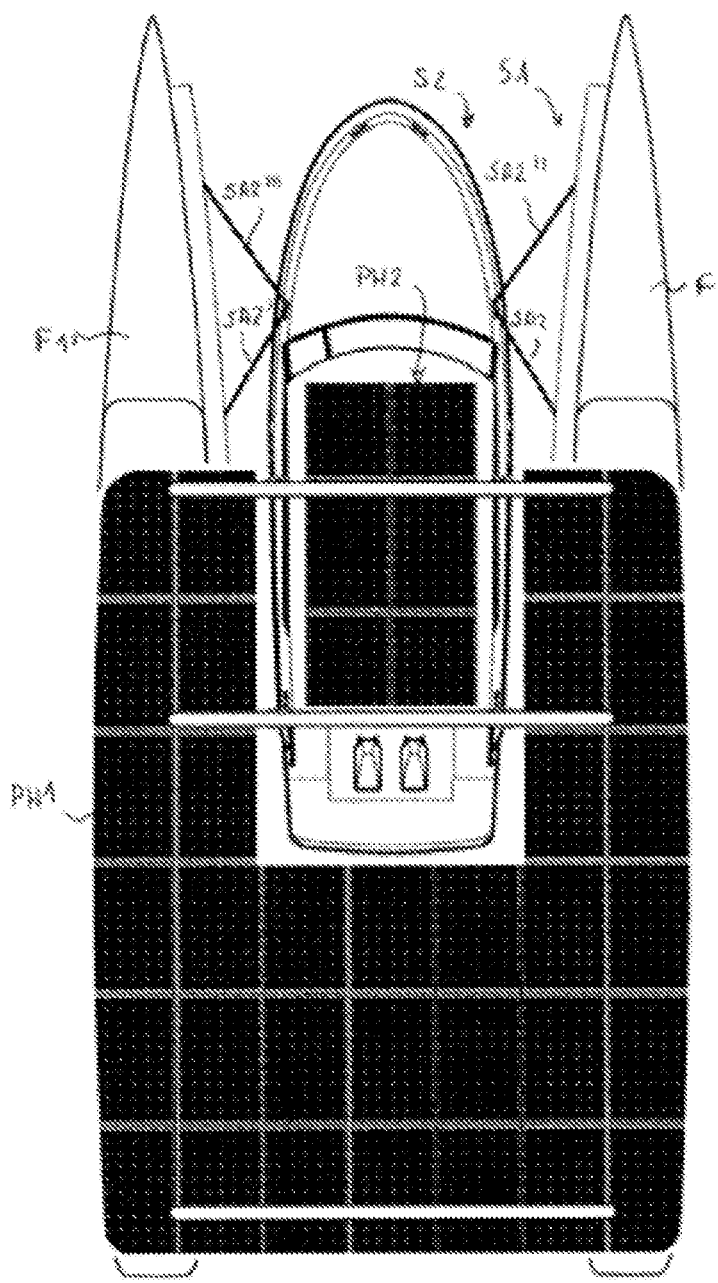
FIG. 32 is a top view of an assembly according to a fifteenth embodiment.
Figure 33:
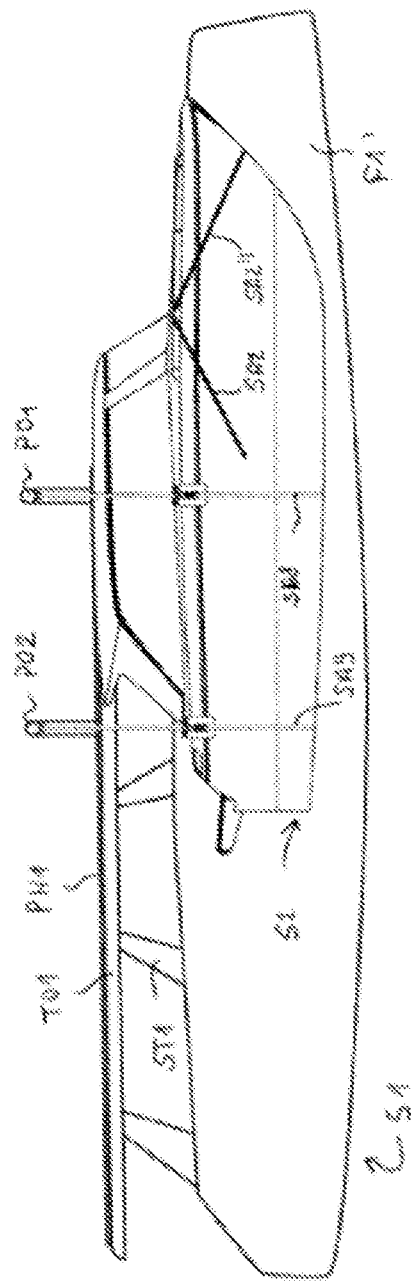
FIG. 33 is a side view of the assembly of FIG. 32.

FIGS. 32 and 33 show a variant embodiment where the assembly S1 forms a catamaran with a general "U" configuration open toward the front. In this case, the structure S2 is engaged in the structure S1 when traveling forward. This Figure also shows that the structure S2 is also provided with a roof TO2 comprising photovoltaic panels PH2 able to contribute to charging batteries that the structure S2 incorporates.

FIGS. 32 and 33 show a first pair of straps SA2, SA2' capable of ensuring the pulling of the structure S1 by the structure S2 when traveling forward and a second pair of straps SA2", SA2'" capable of ensuring the pulling of the structure S1 by the structure S2 when traveling backwards.

Figure 34:
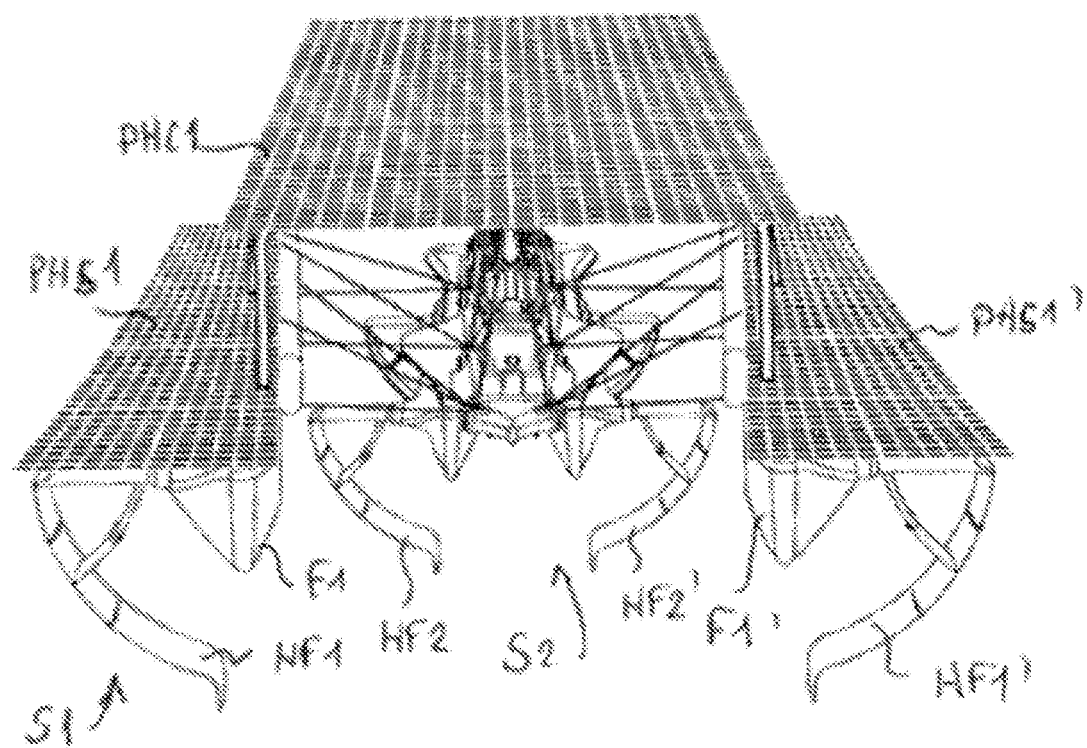
FIG. 34 is a front perspective view of an assembly according to a sixteenth embodiment.
Figure 35:
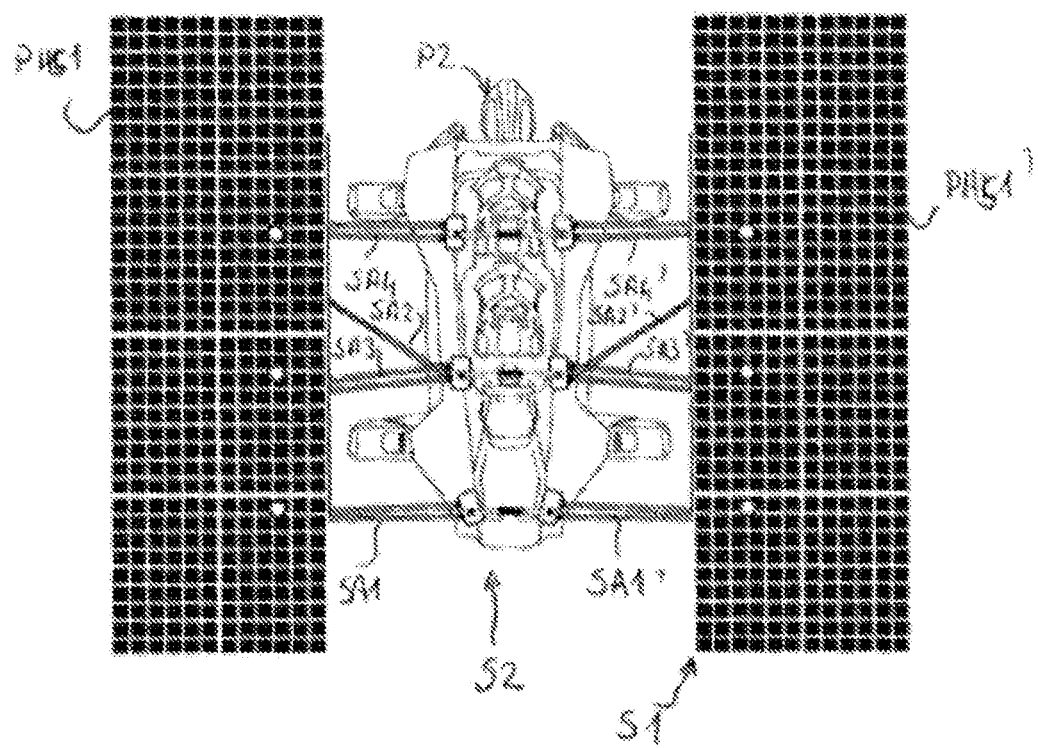
FIG. 35 is a sectional top view of the assembly of FIG. 34.

In reference now to FIGS. 34 and 35, a variant embodiment is shown where the structure S1 and the structure S2 are each of the type with four hydrofoils. The structure S2 and for example of the type sold by Quadrofoil d.o.o., Partizanska ulica 38, 2310 Slovenska Bistrica. The structure S1 can comprise hydrofoils of the same type.

These Figures also show that the structure S1 comprises secondary photovoltaic panels PHS1, PHS1' immediately above the floats F1, F1, and a superstructure ST1 with a roof TO1 provided with central photovoltaic panels PHC1 located at a higher level than the lateral panels to allow accommodation below the structure S2.

In FIGS. 36 to 43, the first structure comprises hydrofoils placed below the respective hulls and the second structure also comprises hydrofoils.

It should be recalled that at least the second structure is propelled and, conventionally, during a turn, the thruster (P2) causes the second structure to rotate by a certain angle about an axis parallel to its longitudinal axis (that is to say, about an axis parallel to its path). In other words, the hull "tilts" laterally during turns, which is conventional.

In the presence of hydrofoils, such a rotation causes a lateral thrust ("rudder effect") on the hydrofoils, the force of which depends on the angle of this rotation.

We will now describe the seventeenth embodiment of the invention, which makes it possible to benefit from such a lateral thrust during turns, not only on the hydrofoils of the second structure, but also on those of the first, the idea here being to obtain an incline of the hydrofoils of the first structure by the same angle as those of the second structure:

The superstructure (ST1) of the first structure is a hinged framework (Parallelogram) maintaining the hulls (Hull) such that, during turns, they all perform a rotation by a same angle about an axis parallel to their path, while remaining on a horizontal plane (if outside influences are not taken into account).

The hinged framework (Parallelogram) comprises hinges placed on parallel lines, in vertical planes perpendicular to the path of the first structure, the lines being vertical when the hulls are not inclined and the angle of the lines relative to the vertical varying depending on the angle of rotation of the hulls. The second structure can be assembled with the first on such a line in each vertical plane, such that a rotation of the hull of the second structure (about an axis parallel to its path) causes a rotation by a same angle for the hulls of the first structure.

Figure 36:
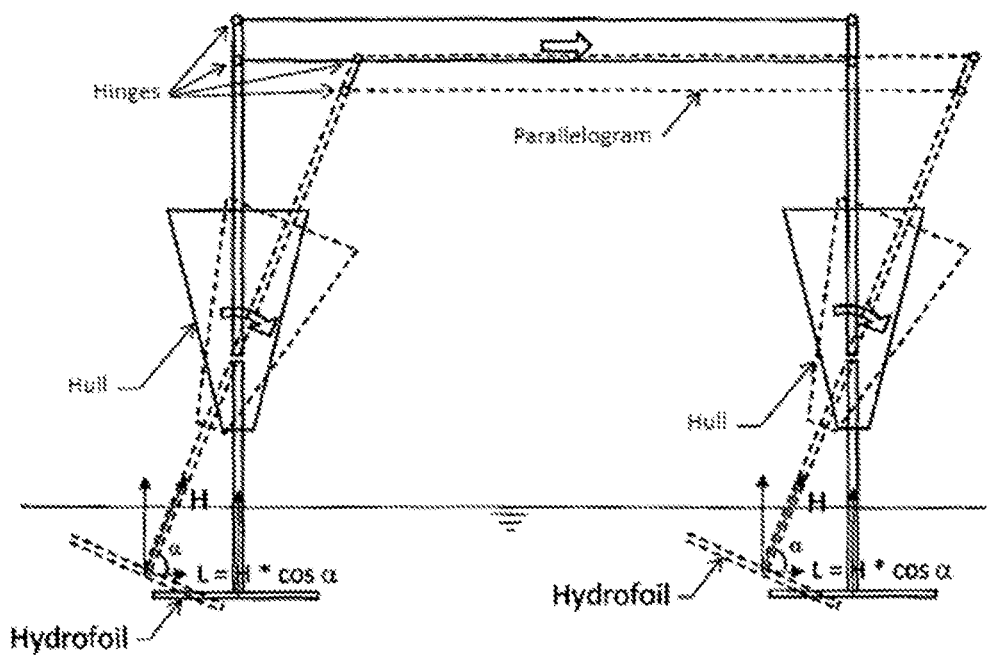
FIG. 36 is a front view of an assembly according to a seventeenth embodiment showing that the normally rectangular shape of the section of the hinged framework (Parallelogram) assumes the form of a parallelogram after the rotation of the hulls.

FIG. 36 schematically shows a front view (more precisely, a vertical section perpendicular to the path) of the first structure (here a catamaran) according to this embodiment and shows that the normally rectangular shape of the section of the hinged framework (Parallelogram) assumes the form of a parallelogram following the rotation of the hulls.

FIG. 36 also indicates that the hydrofoils cause, uniformly below the various hulls, during the turn, a lateral thrust "L" (due to the resistance opposed by the sea), depending on said angle of rotation about an axis parallel to the path.

Indeed, the angle assumed by each hydrofoil following its rotation causes the appearance of a horizontal component of the thrust (H) of the hydrofoil (L=H*Cos: projection on the horizontal plane; in the figure, being equal to 90° minus said angle of rotation)

It can also be seen that the lateral thrust caused by the various hydrofoils generally remains in a same horizontal plane, which results in lateral thrust in a generally horizontal plane.

The rectilinear shape of the hydrofoils, very schematically shown in the figure, is advantageous for this embodiment (compared to curved shapes, in an inclined "V" or triangular, for example).

The second structure can be assembled with the first structure at said parallel lines (in the vertical planes perpendicular to the path) of the hinged framework (Parallelogram), an incline of the hull (and of the hydrofoils) of the second structure then causing an incline by the same angle of the hulls (and hydrofoils) of the first structure.

Figure 37:
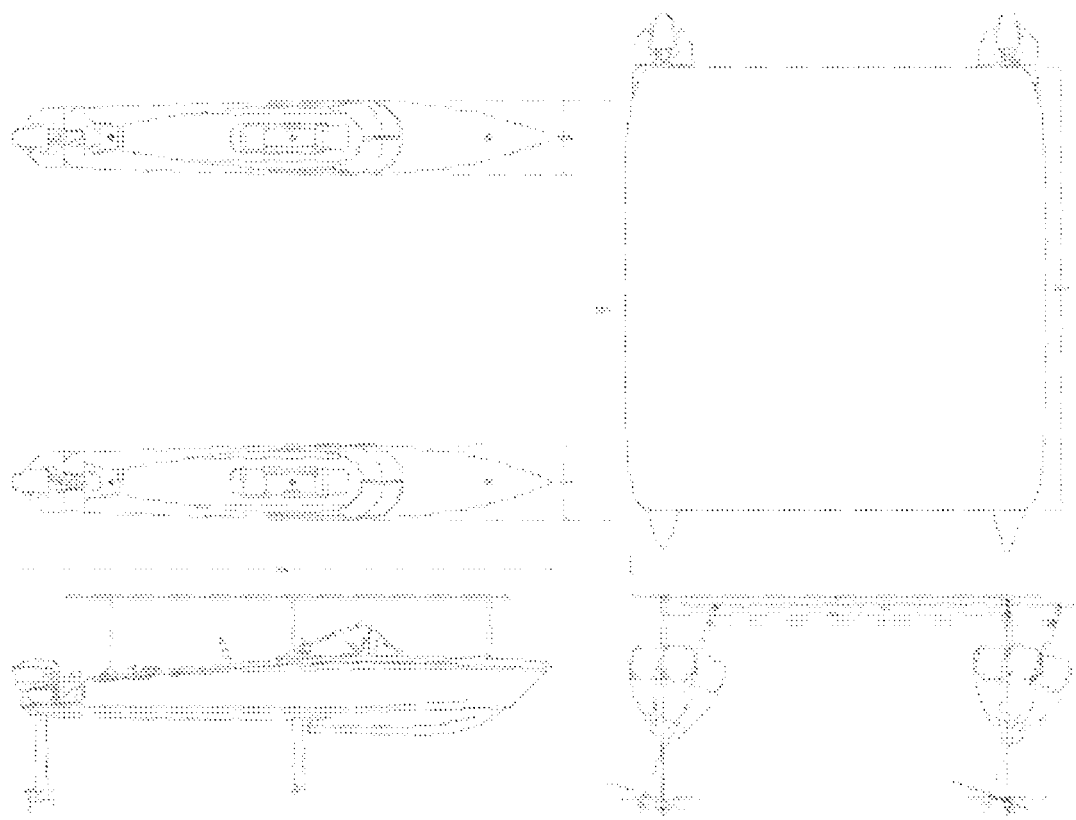
FIG. 37 shows different schematic views of a first structure according to the seventeenth embodiment.

In FIG. 37 and following, the hulls of the first structure are advantageously also provided with thrusters, which add to the propulsion of the assembly and to the inclines causing a lateral thrust during turns, and further allow the first structure to navigate autonomously when it is disassembled from the second structure.

FIG. 37 shows a first catamaran structure, the hulls of which are connected by said superstructure, which is a hinged framework (Parallelogram). In top view, a solar roof is visible, which covers a substantial portion of the assembly. In the other views, the superstructure (Parallelogram) is supported by three vertical pillars on each hull.

Figure 38:
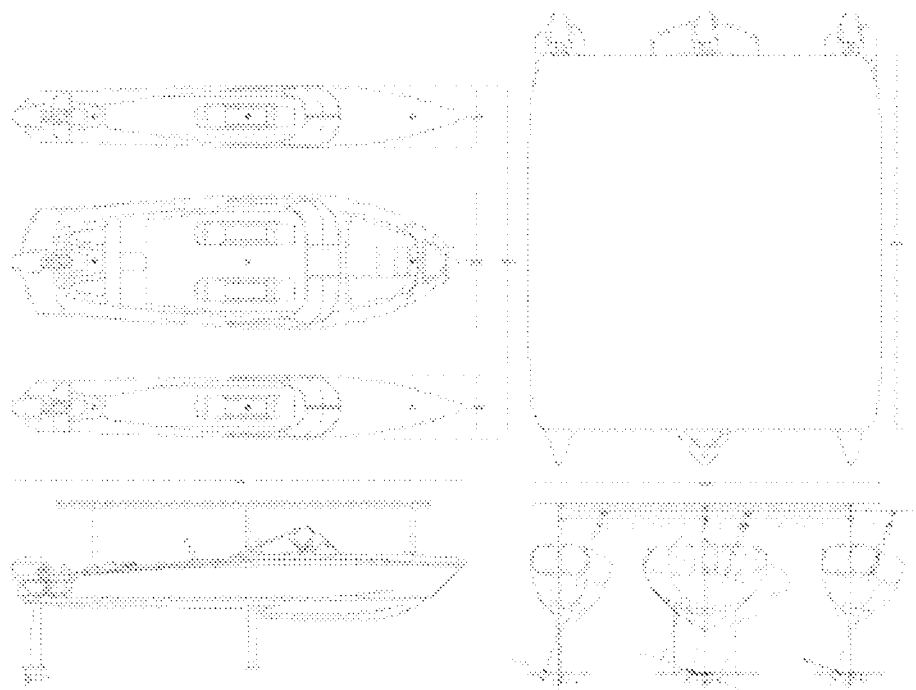
FIG. 38 shows the same views as FIG. 37, but with a first structure assembled with the second structure.

FIG. 38 shows the structure of FIG. 37 assembled with a second structure, both structures having hydrofoils. It can be seen in this figure that, owing to the hinged framework (Parallelogram) of this embodiment of the invention, both structures are inclined by a same angle, while generally remaining on a horizontal plane.

FIGS. 37 and 38 thus illustrate the essential advantages of the invention, namely:

that a second structure can be assembled with the framework (ST1, Parallelogram) of the first structure and in this case, its batteries are powered by the photovoltaic arrangement of the first structure and the hulls of the first structure stabilize it (on high seas, in case of waves) by serving as lateral floats and, in exchange, the first structure uses the second structure to be propelled (or propelled more), an incline of the hull (and of the hydrofoils) of the second structure during turns causing an incline by the same angle of the hulls (and hydrofoils) of the first structure (and vice versa), thus accentuating the turns, and the second structure can be disassembled and disconnected from the first in order to move autonomously as long as its batteries are not discharged (when the sea state allows it, with the advantage of being able to go at a faster speed and while consuming less energy), the first structure continuing to offer a living, sleeping, working, etc. space.

Advantageously, the first structure can comprise electric batteries placed on a structure located between the hulls.

The embodiment presented hereinafter in reference to FIGS. 39 to 43 advantageously uses the weight of the electric batteries to automatically rebalance (self-balancing, load-balancing) a floor located in the space (E1) between the hulls, aiming to keep it horizontal, while dynamically compensating for the off-centered weights (through a simple set of counterweights and pulleys, the electric batteries, while meaning operational, also being used as counterweights).

Thus, FIG. 39 shows the same first structure as in FIG. 37 but with a self-balancing suspended floor between the hulls, rolling electric batteries (able to roll on rails) being used to provide the self-balancing. The figure also shows (in the top view) that a living space can be arranged on the floor.

FIG. 40 illustrates the four cases of off-centered weights: on the left, on the right, in the front and in the back, and uses arrows to show the direction in which the counterweights (the electric batteries) roll in these respective cases.

We will now describe the self-balancing mechanism in detail, in reference to FIG. 41.

The floor is made up of two parts: 1) the ground and 2) the base. These parts are both suspended in the center of the superstructure (Parallelogram) of the first structure.

The base serves as a reference for the horizontality, and the off-centered weights that are found on the floor, which, if applicable, cause a non-horizontality of the floor relative to the base, are compensated by an automatic repositioning of counterweights rolling on rails (the batteries), using a system of pulleys fastened on the base.

Thus, there is a first battery below the floor that can roll on rails horizontally: toward the left and toward the right in the figure, and below this first rolling battery, a second battery can roll horizontally on rails perpendicularly to the first: toward the front and toward the back.

FIG. 41 shows an off-centered weight "P" on the left side (to indicate that the center of gravity has been moved toward the left). As a result, the floor pulls vertically (downward) on the left cord and, via the pulleys, the first battery is pulled and rolls toward the right—this figure shows arrows on the cords around pulleys to indicate which direction they are going.

Only the mechanism for counterbalancing an off-centered weight on the left is shown. When an excess weight is located instead in the front (or in the rear), the rebalancing is done in exactly the same way: the second battery rolls automatically toward the front (respectively toward the rear), that is to say, on the side opposite the excess weight.

Advantageously, this rebalancing is done only when the catamaran is not navigating. During navigation, the batteries are fixed (that is to say, they cannot roll on their rails).

FIG. 42 schematically shows a variant of the floor of FIG. 41, in which the ground is suspended from the base rather than directly from the superstructure, using a set of pulleys (independent of the pulleys used for rebalancing—only the pulleys used to suspend the ground are shown in the figure).

Figure 43:
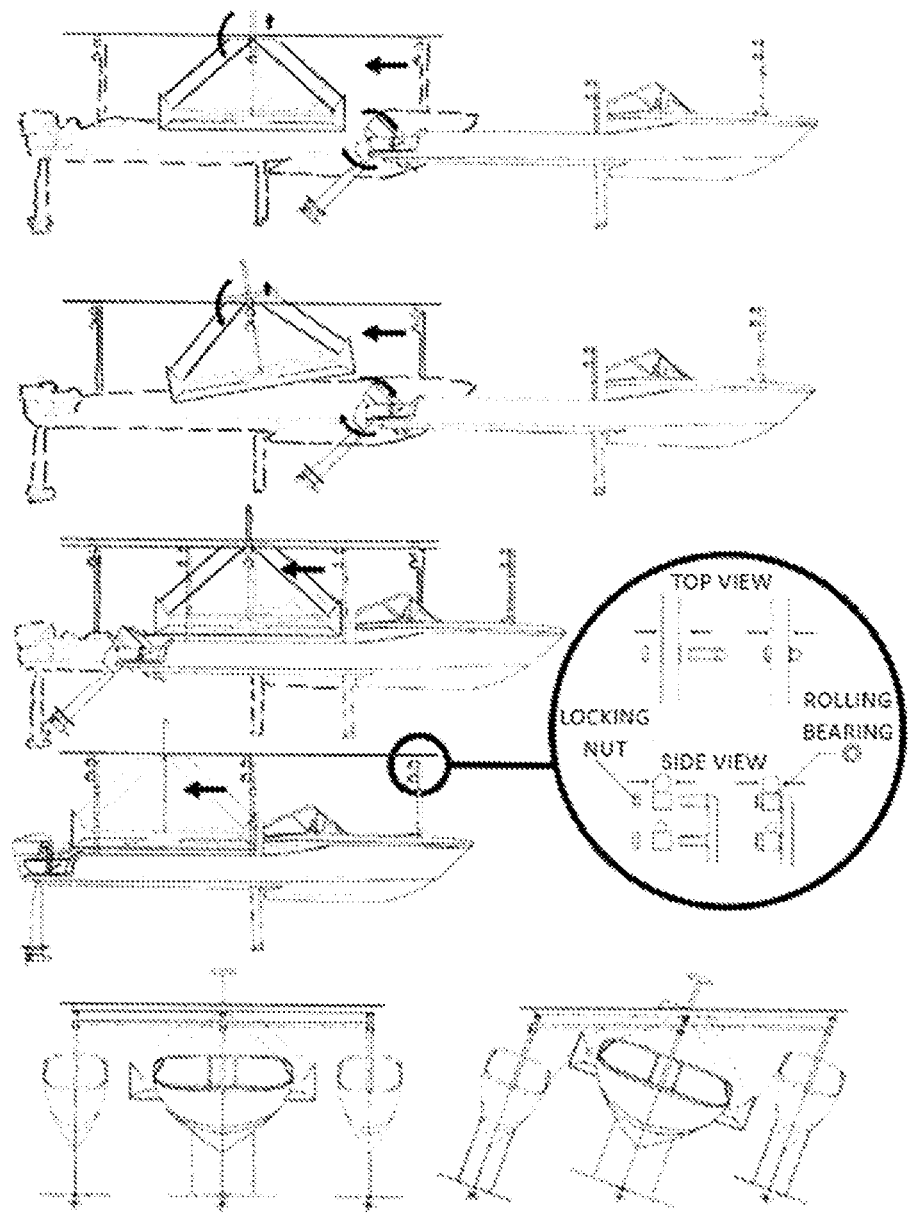

Lastly, FIG. 43 shows side views showing how a second structure can, by traveling forward, place itself in the space (E1) between the hulls, assemble itself with the first structure and support the self-balancing floor, a lever allowing it to be raised upon the arrival of the second structure. Assembly details are shown in the figure.

The figures are schematic and do not show details such as diagonal braces (for example made from nylon) in vertical planes to reinforce the 3 pillars shown for the second structure and the six pillars shown for the first structure.

Advantageously, part of the superstructure can be raised to leave more space below the roof.

Figure 45:
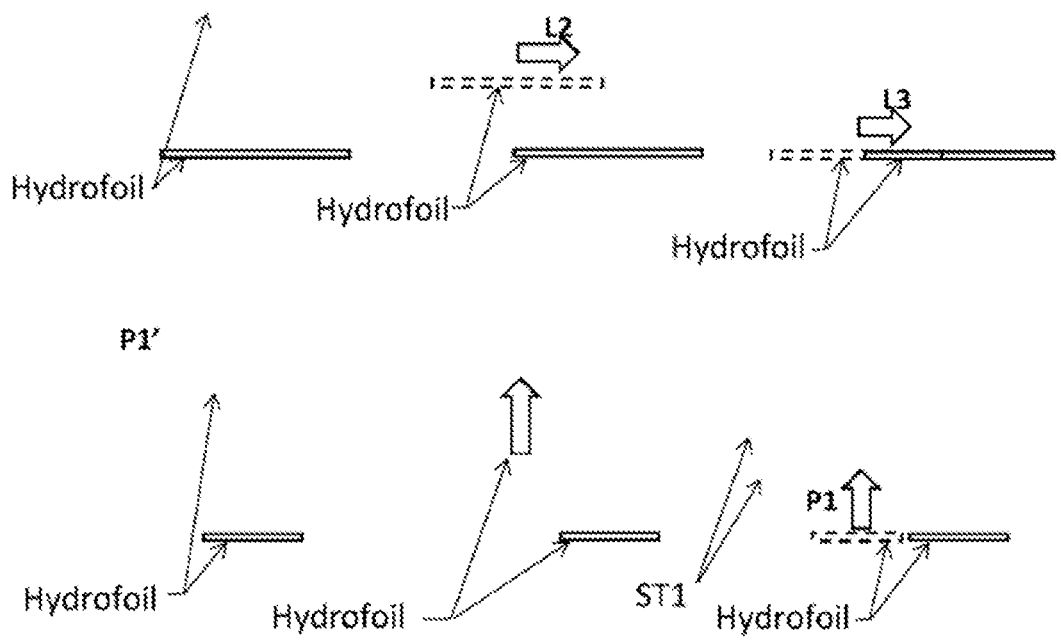

Lastly, FIGS. 44 and 45 respectively show a schematic front view and the corresponding top view of an assembly according to the seventeenth embodiment.

These figures show that it is advantageous for this embodiment to have, toward the middle of the hull, a relatively wider hydrofoil (and a relatively narrower hydrofoil at the propeller, the latter thus causing a weaker lateral thrust than the hydrofoil in the middle during turns), and that it is also advantageous for the superstructure (ST1) to change shape (top view) during turns: to go from the shape of a rectangle to the shape of a parallelogram (Horizontal Parallelogram), as shown in FIG. 45, such that the lateral thrust "L" caused by the hydrofoils of the outermost hulls relative to the turn (that is to say, which are most on the side opposite the turn) are positioned furthest to the front. This transformation can be done by mechanical means or by increasing the power of the outermost thrusters.

Of course, the present invention is in no way limited to the embodiment described and shown in the drawings, but one skilled in the art will know how to provide many variants and modifications thereof.

The invention claimed is:

1. A water-going assembly comprising a first buoyant structure comprising at least two hulls delimiting between them a space and a photovoltaic arrangement occupying a substantial proportion of the footprint of the buoyant structure, and a second buoyant structure provided with at least one electric thruster and a battery, an assembling arrangement for assembling the two buoyant structures detachably, the assembly comprising an electrical connector between the photovoltaic arrangement of the first buoyant structure and the battery of the second buoyant structure, for charging the battery, wherein the second buoyant structure is configured to be selectively used for propelling the two buoyant structures together and allowing them to navigate together with a directional guidance, and wherein the second buoyant structure is configured to be independently propelled as an autonomous motorized marine craft.

2. An assembly according to claim 1, wherein the assembling arrangement comprises a securing device, which in turn comprises shock and/or deformation absorbing elements.

3. An assembly according to claim 2, wherein the first buoyant structure comprises a first pair of fixed lateral floats and a second pair of floats mounted on a movable member pivoting about a vertical axis, the floats of the second pair being located in front of the floats of the first pair.

4. An assembly according to claim 3, wherein said securing device comprises a pulling arrangement for pulling the first buoyant structure via the second buoyant structure.

5. An assembly according to claim 4, wherein the second buoyant structure is connected to the movable member of the first buoyant structure, said movable member being configured to adapting its orientation as a function of the pulling direction.

6. An assembly according to claim 4, wherein the pulling arrangement comprises a pair of cables.

7. An assembly according to claim 6, wherein the cables have a fixed length.

8. An assembly according to claim 4, wherein, when the two buoyant structures are secured together, the second buoyant structure is located essentially in the footprint of the first buoyant structure, the pulling arrangement operating between the front region of the second buoyant structure and the movable member.

9. An assembly according to claim 8, wherein the second buoyant structure mechanically influences the angle of a rudder of the first buoyant structure when the second buoyant structure turns, thus making it possible to perform shorter turns.

10. An assembly according to claim 2, wherein the first buoyant structure comprises a U-shaped hoop, the device for detachably securing the two buoyant structures comprises a means for retaining the second buoyant structure in a front-back direction relative to the first, able to connect the second buoyant structure to the hoop of the first buoyant structure, and, when the two buoyant structures are secured, the second buoyant structure is located in the footprint of the hoop and is able to pull the first buoyant structure via the front-back retaining means.

11. An assembly according to claim 10, wherein the hoop (U-bar) is in the shape of an arc of circle, the center of curvature of which is located in front of the second buoyant structure.

12. An assembly according to claim 10, wherein the hoop (U-bar) is in the shape of an arc of circle, the center of curvature of which is located in the center of the second buoyant structure.

13. An assembly according to claim 10, wherein the rear part of the securing between the second buoyant structure and the hoop can move laterally over the hoop (U-bar).

14. An assembly according to claim 10, wherein said rear part cannot move laterally over the hoop (U-bar) when the second buoyant structure exerts a significant tractive force on the securing.

15. An assembly according to claim 10, wherein the hoop can move laterally by pivoting about a vertical axis.

16. An assembly according to claim 1, wherein the first buoyant structure also comprises at least one electric thruster.

17. An assembly according to claim 1, wherein the first buoyant structure also comprises a battery.

18. An assembly according to claim 1, further comprising an angle control device for controlling an angle between a main axis of the first buoyant structure and a main axis of the second buoyant structure.

19. An assembly according to claim 18, wherein the angle control device comprises a pivot link between the first buoyant structure and the second buoyant structure, and a biasing arrangement for biasing the second buoyant structure from the first buoyant structure at a distance from the pivot link.

20. An assembly according to claim 19, wherein the pivot link is fixed.

21. An assembly according to claim 20, wherein the pivot link is located behind a point where the biasing arrangement operates.

22. An assembly according to claim 21, wherein the biasing arrangement comprises a device.

23. An assembly according to claim 22, wherein the pivot point can move relative to the first buoyant structure.

24. An assembly according to claim 22, wherein the bearing surface is curved.

25. An assembly according to claim 21, wherein the pivot point is capable of sliding against a bearing surface, the pivot point and the bearing surface being adapted to transmit, to the first buoyant structure a thrust generated at the second buoyant structure.

26. An assembly according to claim 19, wherein the biasing arrangement is adapted to exert a traction laterally on the second buoyant structure behind said pivot link.

27. An assembly according to claim 1, further comprising a superstructure which is tilted forwardly so as to reduce wind resistance.

28. An assembly according to claim 27, further comprising a floor suspended from the superstructure, and movable electric batteries operating as counterweights to rebalance the floor.

29. An assembly according to claim 1, wherein the assembling arrangement between the two buoyant structures comprises an assembly device comprising a suspension device for suspending the second buoyant structure from a framework of the first buoyant structure.

30. An assembly according to claim 29, wherein the assembly device comprises a first retaining device for retaining the second buoyant structure in a front-back direction relative to the first buoyant structure.

31. An assembly according to claim 30, wherein the assembly device comprises a second retaining device for retaining the second buoyant structure laterally relative to the first buoyant structure.

32. An assembly according to claim 31, wherein the assembly device comprises a third retaining device for retaining the second buoyant structure top-to-bottom relative to the first buoyant structure.

33. An assembly according to claim 29, wherein the suspension device comprise straps.

34. An assembly according to claim 33, wherein that some of the straps extend obliquely toward the rear, from the second buoyant structure toward the first buoyant structure.

35. An assembly according to claim 29, wherein said framework bears a roof supporting said photovoltaic arrangement.

36. An assembly according to claim 29, wherein at least one among the first buoyant structure and the second buoyant structure comprises hydrofoils.

37. An assembly according to claim 29, wherein the floats of the first buoyant structure comprises floats hinged on said framework about axes that are generally parallel to a longitudinal axis of said first buoyant structure, and further comprises wheels extending downward past the floats in a certain angular position of the floats.

38. An assembly according to claim 37, further comprising a device for angularly locking of the floats in a navigation position or in a rolling position, respectively.

39. An assembly according to claim 37, wherein each float of the first buoyant structure comprises a buoyancy tank, and the first buoyant structure comprises a filling device for selectively filling each of the buoyancy tanks with water or air.

40. An assembly according to claim 29, wherein said photovoltaic arrangement of the first buoyant structure comprises mobile panels capable of being selectively deployed.

41. An assembly according to claim 29, wherein the electric thruster is capable of causing, during a turn, a rotation of a hull by a certain angle about an axis that is generally parallel to a path of the assembly, wherein said framework comprises a hinged assembly in the shape of a parallelogram, the angles of which vary depending on said angle of rotation, thus causing a rotation by a same angle for all the hulls of the assembly.

42. An assembly according to claim 41, wherein said framework comprises hinges placed on parallel lines, in vertical planes perpendicular to a path of the assembly, the lines being vertical when the hulls are not inclined laterally and the angle of the lines relative to the vertical varying depending on the angle of rotation of the hulls, the second buoyant structure being able to be assembled with the first buoyant structure on hinges placed on respective lines in each vertical plane, such that a rotation of the hull of the second buoyant structure about an axis parallel to its trajectory causes a rotation by a same angle for the hulls of the first buoyant structure and vice versa.

43. An assembly according to claim 42, wherein said angles vary depending on the angle of a rotation caused by said electric thruster of the second buoyant structure about an axis that is generally parallel to its path.

44. An assembly according to claim 41, wherein said angles vary depending on the angle of the rotations caused by said at least one electric thrusters of the first buoyant structure about axes that are generally parallel to their path.

45. An assembly according to claim 41, wherein said angles vary depending on the angle of the rotations caused by the electric thrusters of the first and second buoyant structures about axes that are generally parallel to their path.

46. An assembly according to claim 41, further comprising, below the hulls and at the thruster or thrusters, hydrofoils causing a lateral thrust, the force of which depends on said angle of rotation.

47. An assembly according to claim 29, further comprising a floor suspended from the hinged framework (ST1) of the first buoyant structure, and electric batteries serving as counterweights to rebalance the floor automatically by moving them on rails.

48. An assembly according to claim 29, wherein viewed from a top, the superstructure of the first buoyant structure goes from the shape of a rectangle to the shape of a parallelogram and the lateral thrust caused by the outermost hydrofoils relative to the turn are located further forward after this transformation.

49. An assembly according to claim 48, wherein the superstructure in the shape of a parallelogram bears the roof, which bears the photovoltaic arrangement, and the latter is made up of bands of photovoltaic panels that slide relative to one another such that the surface occupied by the set of bands continually corresponds to the parallelogram during said passage from the rectangular shape to the parallelogram shape.

50. An assembly according to claim 48, wherein the passage from the rectangular shape to the parallelogram shape is obtained by an electromechanical arrangement.

51. An assembly according to claim 48, wherein the first buoyant structure also comprises at least one two electric thrusters and the passage from the rectangular shape to the parallelogram shape is obtained by a higher power on a thruster propelling a hull that is further to the outside relative to the turn.

* * * * *